(12) United States Patent
Fish et al.

(10) Patent No.: US 12,149,524 B1
(45) Date of Patent: Nov. 19, 2024

(54) LOAD BALANCING NETWORK FOR DYNAMICALLY ADAPTING AND COMMUNICATING DATA

(71) Applicant: WINGSTOP RESTAURANTS INC., Addison, TX (US)

(72) Inventors: Kevin Fish, Carrollton, TX (US); Samir Ray, Dallas, TX (US)

(73) Assignee: Wingstop Restaurants Inc., Addison, TX (US)

( * ) Notice: Subject to any disclaimer, the term of this patent is extended or adjusted under 35 U.S.C. 154(b) by 0 days.

(21) Appl. No.: 18/631,768

(22) Filed: Apr. 10, 2024

(51) Int. Cl.
*H04L 29/06* (2006.01)
*H04L 9/40* (2022.01)

(52) U.S. Cl.
CPC .......... *H04L 63/083* (2013.01); *H04L 63/105* (2013.01); *H04L 63/107* (2013.01)

(58) Field of Classification Search
CPC .... H04L 63/083; H04L 63/105; H04L 63/107
See application file for complete search history.

(56) References Cited

U.S. PATENT DOCUMENTS 9,424,429 B1 * 8/2016 Roth ................. G06F 3/0304
2020/0333426 A1 * 10/2020 Dupray ............. G01S 5/0258

* cited by examiner

*Primary Examiner* — Tri M Tran
(74) *Attorney, Agent, or Firm* — Baker & McKenzie LLP

(57) ABSTRACT

The disclosed method includes: receiving first and second user requests; executing, using a traffic security system, a first security operation associated with a network; executing, using the traffic security system, a second security operation associated with the network; determining, using an API authorizer, whether the first user request associated with the first user originates from a first approved application; and determining, using the API authorizer, whether the second user request associated with the second user originates from the first approved application or a second approved application. In response to the API authorizer determining the first user request and the second user request originate from the approved applications, the method includes: directing, an API entry point, to activate APIs for responding to the first and second user requests; and coordinating or distributing, using a network load balancer, execution of the first and second user requests.

20 Claims, 40 Drawing Sheets

SUMMARY 2

NOTE: Fields marked with an asterisk (*) are required.

CONTACT INFO

First Name *  — 510a
[Name of Requestor]

Last Name *  — 510b
[Name of Requestor]

Email *  — 510c
[Email]

Phone *  — 510d
[XXX XXX XXXX]

☑ Optional Notifications

REQUEST ACTIVATION TAB — 511

—— OR ——

LOCATIONS

LOCATION DATA — 509a

Ready in 16-21 minutes

COMPLETE SURVEY

FIG. 5H

LOCATIONS

*Request Closeout Page*

512 —— *[Estimates Completion Time]*

513 —— *Request Completion Indicator*
Date
Request Ref

509a —— *Location Data*

514 —— *Summary 3*

← Locations List

☁ Location Status Indicator —602

Specific Location [Public] —601-b4
Process Indicator

Details  Hours  Configurations  Attributes  Overrides  Components  Parametric List  Users  System Admin Can a request fulfillment time precede locations open times and extends past close?

⊙⊙ } 603  Allow requests to be due at open
⊙⊙      Allow requests to be due past close

Quote Time

Standard quote time
How long does it take to process request?

Current quote time
How long is it currently taking for requests?

Minimum quote time
The minimum amount of time it takes for any requests?

604 { [18 minutes]
      [18 minutes]
      [7 minutes]

Cancel  [Save]

Dashboard
Locations
Requests
Global Catalog
Structure ▸
Fraud
Users
Settings

| Dashboard | Location Page | | | | Create New Store |
|---|---|---|---|---|---|
| Location | | | | | |
| Requests | Search 🔍    More + ▶ | | | | |
| Global Catalog | | | | | |
| Structure | ⊙ Only show locations with exceptions | | | | |
| | ☐ Location Name | State | Quote Time | Alerts | |
| | ☐ Location ID1 | | $T_1$ | | |
| Fraud | ☐ Location ID2 | | $T_2$ | | |
| Users | ☐ Location ID3 | | $T_3$ | | |
| Settings | ☐ Location ID4 | | $T_4$ | | |
| | ☐ Location ID5 | | $T_5$ | | |
| | | | Locations per page 50 ▶ | 1-5 of 5 | |

Edit Details

Modifier Groups

Global Modifier Group
Date Group Name

Name Type
Choose Name

Message
Up to 3

Modifiers
Modifier | Regional Name

- ☐ Default
- ☐ Default
- ☐ Default
- ☐ Default
- ☐ Default

607 Modifiers that determine degrees of freedom

Cancel | Save

FIG. 6N

Users

Search Users 🔍 | Status ▸

| Last Name | First Name | Email | Location Assignment | Status |
|---|---|---|---|---|
| Username1 | | | Location 1 | Active |
| Username2 | | | Location 2 | Active |
| Username3 | | | Location 3 | Active |
| Username4 | | | Location 4 | Invited |
| Username5 | | | Location 5 | Active |
| | | | Location 1 | Active |
| | | | Location 2 | Invited |

Invite User

- Dashboard
- Location
- Requests
- Global Catalog ▸
- Structure
- Fraud
- Users
- Settings

FIG. 6Q

LOAD BALANCING NETWORK FOR DYNAMICALLY ADAPTING AND COMMUNICATING DATA

TECHNICAL FIELD

The present disclosure leverages a data managing system to adaptively analyze and/or communicate data in one or more complex computing networks.

BACKGROUND

In complex computing networks that individually or simultaneously ingest vast amounts of similar or dissimilar data and/or similar or dissimilar requests from a plurality of users, there is a need to optimize and/or efficiently execute computing operations for data intake, data distribution, data analysis, and output data generation for users of such networks.

SUMMARY

Disclosed are methods, systems, and computer programs for handling or managing user requests within a complex computing network. According to an embodiment, a method for handling user requests received in a network comprises: receiving a first user request associated with a first user; receiving a second user request associated with a second user; executing, using an authentication security system, a first security operation associated with a network, wherein the first security operation comprises determining whether the first user is allowed to access the network; and executing, using the authentication security system, a second security operation associated with the network, wherein the second security operation comprises determining whether the second user is allowed to access the network. The method also comprises: determining, using an application programming interface (API) authorizer, whether the first user request associated with the first user originates from a first approved application; and determining, using the API authorizer, whether the second user request associated with the second user originates from the first approved application or a second approved application.

In response to the API authorizer determining the first user request originates from the first approved application, the method comprises directing, an API entry point, to activate a first API for responding to the first user request. In response to the API authorizer determining the second user request originates from the first approved application or the second approved application, the method comprises directing, the API entry point to activate the first API or a second API for responding to the second user request.

In some embodiments, the method comprises: coordinating or distributing, using a network load balancer, execution of the first user request and execution of the second user request by an analytics system associated with the network; resolving, using the analytics system associated with the network and based on the first API, the first user request to determine one or more first parametric lists or first parametric data objects associated with a first location relative to the first user; and resolving, using the analytics system associated with the network and based on the first API or the second API, the second user request to determine one or more second parametric lists or second parametric data objects associated with a second location relative to the second user.

In some cases, the method comprises: adapting, using the analytics system associated with the network and based on first data comprised in the first request, the first parametric data objects to generate an adapted first set of parametric data objects for the first location, thereby linking the adapted set of parametric data objects to location data associated with the first geographical location to modify a first parametric list such that the first parametric list comprises the adapted first set of parametric data objects; and adapting, using the analytics system associated with the network and based on second data comprised in the second user request, the second parametric data objects to generate an adapted second set of parametric data objects for the second location, thereby linking the adapted set of parametric data objects to location data associated with the second geographical location to modify a second parametric list such that the second parametric list comprises the adapted second set of parametric data objects.

In one embodiment, the method includes: initiate formatting, using the first API, first content data comprising the modified first parametric list for display on a graphical interface to the first user or a third user associated with the first location; and initiate formatting, using the second API or the first API, second content data comprising the modified second parametric list for display on a graphical interface to the second user or a fourth user associated with the second location.

In response to the first user interacting with the first content data, the method comprises updating the modified first parametric list for the first geographical location. In response to the second user interacting with the second content data, the method comprises updating the modified second parametric list for the second geographical location.

In other embodiments, a system and a computer program product can include or execute the above method. These and other implementations may each optionally include one or more of the following features.

The traffic security system, according to one embodiment, interacts with a network interface for enabling the first user associated with the first user request received from a first computing device to connect to the network.

In other embodiments, the first parametric list comprises one or more of: component combination data associated with the one or more first parametric lists or first parametric data objects; and parametric data object combination data associated with one or more of the first parametric lists or the first parametric data objects.

Furthermore, the component combination data can comprise a combination of one or more components associated with the first parametric data objects while the parametric data object combination data comprises a combination of one or more parametric data objects including the first parametric data objects.

According to some embodiments, the method further comprises providing access, using a security repository system and using the API entry point, to the analytics system.

In some cases, in response to the first user interacting with the first content data or the second user interacting with the second content data, the method comprises updating a third parametric list associated with a third geographical location or a fourth geographical location to generate a modified third parametric list. It is appreciated that the method further comprises providing, on a graphical display device, the modified third parametric list to one or more of: the first user; the second user; a third user associated with the third geographical location; or a fourth user associated with a fourth geographical location. In some implementations, the modified third parametric list may be generated based on arriving at or exceeding a component threshold data value associated with at least one of the first geographical location, the second geographical location, the third geographical location, or the fourth geographical location.

In some embodiments, the first user comprises an administrative or non-administrative user.

In addition, the method may further comprise enabling the first user, or a third user, selective access to the modified first parametric list for the first geographical location.

According to some embodiments, the method comprises dynamically generating the modified first parametric list by adjusting the adapted first parametric data objects or third parametric data objects associated with the first geographical location based on availability data variably indicating data changes to component information associated with the first geographical location.

Moreover, the method comprises determining that the first geographical location is associated with the first user as well as determine that the second geographical location is associated with the second user.

It is appreciated that the first user request may be received from a mobile or non-mobile computing device. It is further appreciated that the analytics system can comprise one or more dynamic container services.

In some cases, the method comprises providing a message broker system for coordinating progression of the first user request or the second user request. In addition, the method may comprise providing a structured database system to enable determining that a computing operation being executed in the network is within an operational threshold or limit. In some cases, the method comprises providing a dynamic cache system for reading data from or writing data to a database system or a content storage system. It is appreciated that the method may comprise providing a messaging system to facilitate electronic communication among one or more systems or devices connected to the network.

BRIEF DESCRIPTION OF THE DRAWINGS

This disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion. Further, some components may be omitted in certain figures for clarity of discussion.

FIGS. 5A-5I indicate exemplary transitions of a plurality of interfaces based on user requests.

DETAILED DESCRIPTION

Overview

Figure 1A:
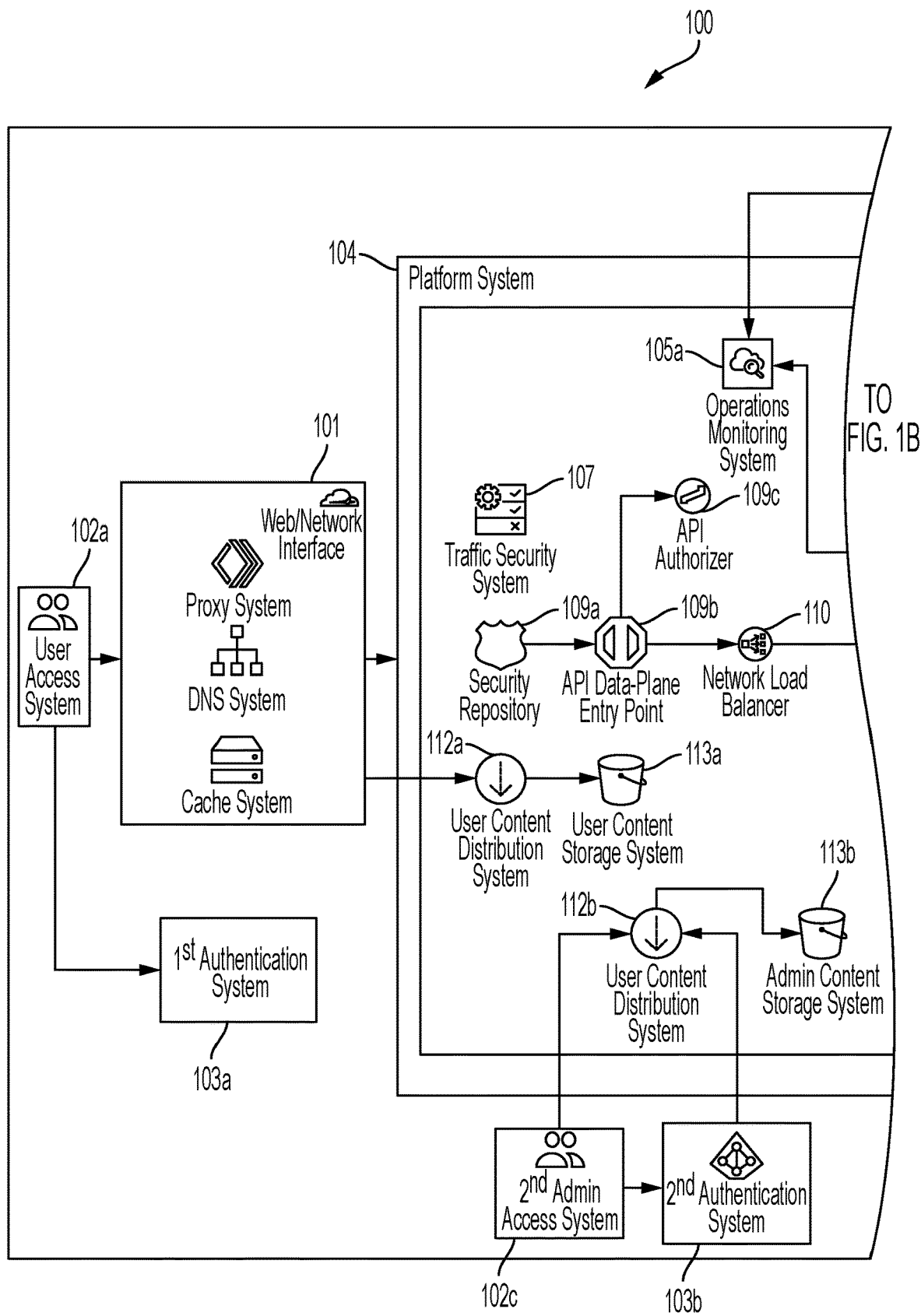
FIGS. 1A-1B show an exemplary network environment for data orchestration and load balancing operations associated with dynamically adapting and communicating data.

The disclosed solution, according to one embodiment comprises a front-end system (e.g., one or more user access or admin access systems), a platform system, and an analytics system. The front-end system may comprise software including an application (e.g., a web-application or a non-web application or a mobile application or a non-mobile application) that generates one or more data interfaces or fast dynamic interfaces on display devices associated with computing devices such as a desktop computer, a laptop computer, a mobile computing device, an audio computing device, a gesture-based computing device, a wearable computing device, etc. In one embodiment, the application is based on a software framework that supports fast dynamic interfaces associated with the front-end system. For example, the framework may beneficially: facilitate development of a plurality of fast dynamic interfaces associated with the application from a single codebase; minimize dependence on secondary platforms that are separate from the disclosed platform system; enable fast updates and deployment of patches and computing security features to the application as well as other software associated with the front-end system; enable high portability across the platform system; etc. It is appreciated that the application may electronically communicate with the platform system and/or the analytics system and/or other third-party systems as the case may require. It is further appreciated that the aforementioned fast dynamic interfaces can comprise or be associated with an application (e.g., a web or non-web application), a website, or some other portlet or digital page that can be rapidly or dynamically deployed or otherwise created on a display device based on one or more of a user request or a user command, a page definition, a portlet definition, or a combination thereof.

According to one embodiment, the platform system comprises cloud computing systems that are scalable or are otherwise capable of being increased or decreased in terms of the amount computing resources (e.g., cloud computing resources) required to manage similar or dissimilar data and/or similar or dissimilar requests from a plurality of users thereby meeting user requests without any disruption to the operations of the front-end system and/or the platform system and/or the analytics system and/or third-party systems. Furthermore, the platform system is designed to adapt through time and thereby meet evolving requests from users.

In addition, the platform system beneficially facilitates integration of a plurality of third-party systems associated with the disclosed solution such that each third-party system comprised in the plurality of third-party systems is digitally isolated or otherwise independent from other third-party systems and is replaceable without affecting operations of other third-party systems or the analytics system associated with the platform system.

The analytics system, according to some embodiments, is comprised in the platform system and is configured to: conduct a plurality of analysis operations associated with user requests; generate content data used to configure or otherwise populate a plurality of fields associated with the application discussed in association with the front-end system; and conduct a plurality of modeling operations based on the content data and/or analysis operations. In some embodiments, the analytics system is a third-party system that is coupled to the platform system and which can be directly or indirectly accessed by the platform system and/or the client system as the case may be.

It is appreciated that computing security for the front-end system, the platform system, and/or the analytics system are electronically isolated from each-other for enhanced detection and/or mitigation of any security breaches associated with the disclosed solution. In some embodiments, one or more breach models (e.g., machine learning models or non-machine learning models) are applied to one or more of the front-end-system, the platform system, and the analytics system to anticipate or otherwise prepare against security infiltrations that detrimentally impact the front-end-system, the platform system, and/or the analytics system.

In one embodiment, the disclosed technology is scalable and/or extensible to allow continued expansion of the front-end system and/or the platform system, and/or the analytics system. In one embodiment, one or more of the front-end system, the platform system, and the analytics system operates based on application(s) associated with a cloud computing platform. The cloud computing platform may comprise a scalable message-based architecture that is robust or otherwise digitally resilient to facilitate a plurality of computing integrations through processors that are adapted for modular scalability.

In some implementations, the disclosed solution comprises one or more machine learning models that are configured to optimize and/or enhance and/or improve data operations associated with the front-end system, and/or the platform system, and/or the analytics system. For example, one or more computing models and/or cloud applications may be configured to facilitate managing data requests associated with a one or more parametric data objects and/or requests associated with parametric lists and/or requests associated with data components comprised in parametric data objects or parametric lists as the case may require. In one embodiment, the one or more computing models are artificial intelligence or machine learning models that are configured to track data operations associated with the network environment discussed below, provide workflow or other data recommendations to one or more users, and dynamically manage the execution of operations by the analytics system discussed herein.

Exemplary Network Environment

Figure 1B:
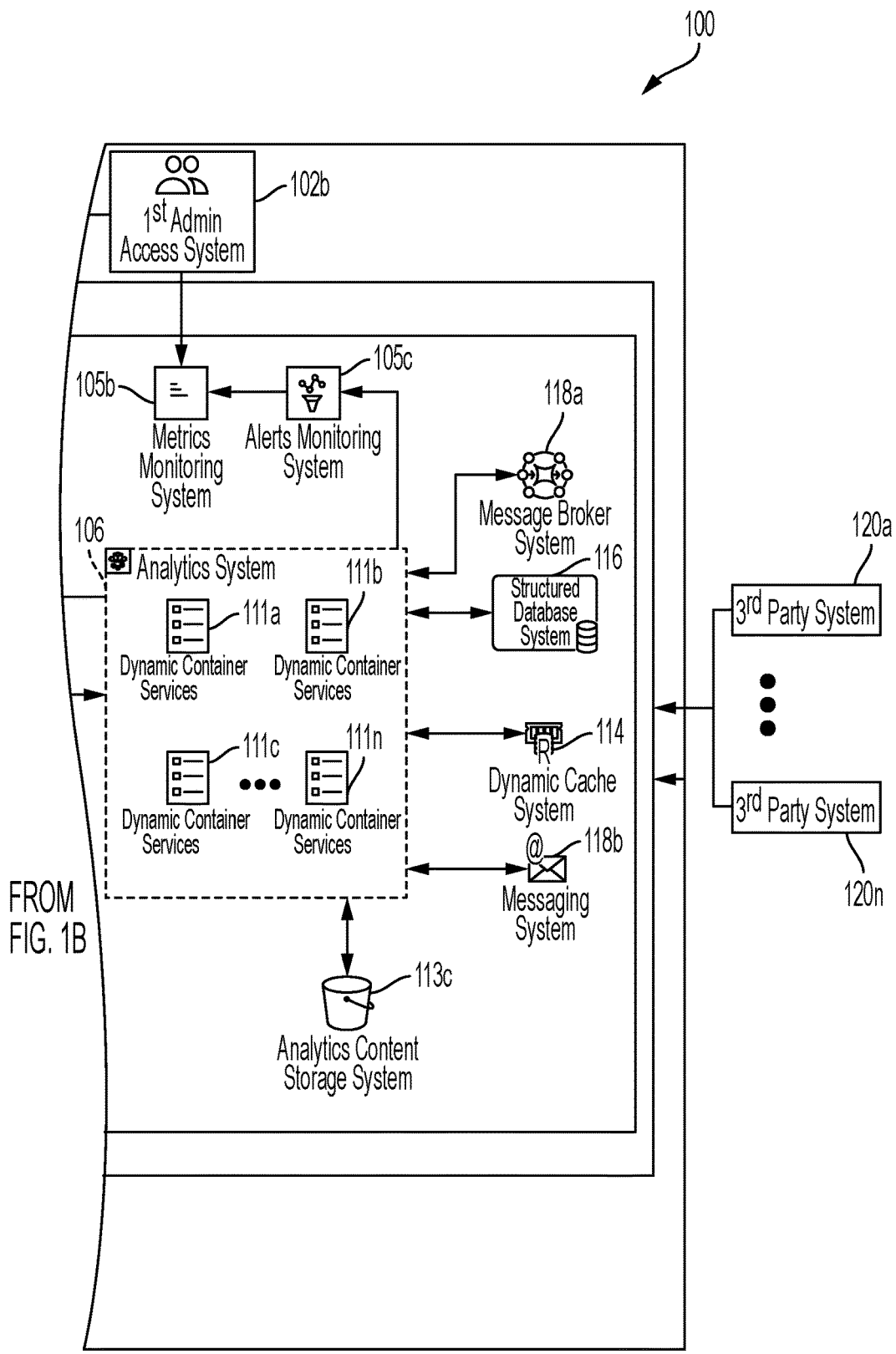

FIGS. 1A and 1B show an exemplary network environment 100 for data orchestration and/or load balancing operations associated with dynamically adapting and communicating data within one or more computing networks. In particular, these figures show a coupling of one or more of a user access system 102a, a platform system 104, and a plurality of third-party systems 120a . . . 120n.

As can be seen in these figures, a first user (e.g., an admin or non-admin user) may access the platform system 104 using one or more user access systems 102a. Prior to accessing the platform system 104, the first user may undergo an authentication process that validates or otherwise confirms security data (e.g., user credential data or user account data) via, for example, a webpage using the $1^{st}$ Authentication system 103a. According to one embodiment. The $1^{st}$ authentication system 103a comprises a non-native authentication service administered by a third-party computing security system. In other embodiments, the $1^{st}$ authentication system 103a comprises a native authentication service administered by a security system associated with or integrated into the platform system 104.

After authentication, the first user is provided a webpage or some other web or non-web visualization powered by an application that is accessible via the web/network interface 101. In particular, a display device associated with the user access system 102a may be used to display the webpage or web/non-web visualization via the web/network interface 101. Following this, the first user may provide input data such as data requests, data request confirmations, data request cancelations, etc., as the case may require, associated with parametric lists and/or parametric data objects and/or data components associated with parametric lists and/or parametric data objects.

According to one embodiment, the web/network interface 101 provides a first layer of security against unauthorized access to the platform system 104 or other system infiltrations to the platform system 104 by any user (e.g., a hacker) who is not authorized to access the platform system. In other embodiments, the web/network interface 101 organizes and/or formats and/or provides content data via a webpage or a web/non-web visualization to an authorized user.

In some embodiments, the web/network interface 101 coordinates with the traffic security system 107 for front-end security operations associated with the platform system 104 and/or the user access system 102a. As mentioned above, the web/network interface 101 serves as a first security layer (e.g., a Firewall) for the platform system 104 while the traffic security system 107 serves as a second security layer for the platform system 104. It is appreciated that he web/network interface 101 works in tandem with the traffic security system 107 to determine, for example, bad actors (e.g., hackers), malicious applications (e.g., viruses, etc.), and other unusual and/or detrimental computing operations and/or unauthorized applications within the network environment 100 of FIGS. 1A and 1B.

In some cases, the web/network interface 101 executes a first computing security operation to determine that a user can access the platform system 104. Following this determination, the traffic security system 107 may be notified with user-type data that indicate properties of a user which the traffic security system 107 should be monitoring as the user access system 102a communicates with the platform system 104. If the operations being executed by a user deviates from normal, secure, or uncompromising operations expected from said user access system 102a, the traffic security system 107 uses the user-type data to flag said deviations and initiates system security processes that either correct said deviations or block access to the platform system 104. Thus, communications between the web/network interface 101 and the traffic security system 107 beneficially facilitate security verification operations associated with the platform system 104 and/or security monitoring operations associated with the platform system 104. It is appreciated that one or more security or non-security related data (e.g., download data, metadata, etc.) associated with a user interacting with the platform system 104 may be organized (e.g., organized as cloud data packages) by the user content distribution system 112*a* and stored in the content storage system 113*a* for subsequent legacy and/or auditing operations should the need arise for same.

According to some embodiments, the traffic security system 107 comprises computing rules or computing instructions that dynamically allow (e.g., fully allow or partially allow) or deny access to the platform system 104. For example, the computing rules or instructions may comprise: geographic rules or instructions that allow or deny a user or a user access system 102*a* access to the platform system 104 based on location data of a network associated with the user access system 102*a* or location data associated with the user access system 102*a*; organizational rules or instructions that allow or deny the user or the user access system 102*a* access to the platform system 104 based on an organization to which the user or the user access system 102*a* belongs; group rules or instructions that allow or deny the user or the user access system 102*a* access to the platform system 104 based on a group to which the user or the user access system 102*a* belongs; user-data based rules or instructions that allow or deny the user or the user access system 102*a* access to the platform system 104 based on historical interactions of the user or the user access system 102*a* with the platform system 104; device-based rules or instructions that allow or deny the user or the user access system 102*a* access to the platform system 104 based on device type data associated with the user access system 102*a*; network data rules or instructions that allow or deny the user or the user access system 102*a* access to the platform system 104 based on a network through which the user or the user access system 102*a* is trying to access the platform system 104; bandwidth or rate-limiting rules or instructions that allow or deny the user or the user access system 102*a* access to the platform system 104 based on data bandwidths associated with the computing operations being executed by the user access system 102*a*; signature-based (e.g., attack signature, application signature, virus signature, etc.) rules or instructions that allow or deny the user or the user access system 102*a* access to the platform system 104 based on an application or a computing tool being used by the user or the user access system 102*a* to access the platform system 104.

According to one embodiment, the security repository system 109*a* comprises mapping data or linking data used to connect or otherwise link the user access system 102*a* and/or the $1^{st}$ admin access system 102*b* and/or the $2^{nd}$ admin access system 102*c* to appropriate computing resources and/or computing services and/or computing operations associated with the platform system 104. For example, the security repository system 109*a* may be used to: provide an authorized user access to the analytics system 106 via the API data-plane entry point 109*b* and to the network load balancer 110; execute route domain traffic operations; and execute domain resolution operations.

In some embodiments, the API data-plane entry point 109*b* comprises a plurality of APIs that link or otherwise connect a plurality of user requests to appropriate computing applications or services comprised in the analytics system. In one embodiment, the API data-plane entry point 109*b* may be coupled to an API authorizer 109*c* that confirms, approves, authenticates, or otherwise validates specific APIs comprised in the plurality of APIs to execute specific computing requests from users of the network environment 100. For example, the API authorizer 109*c* may confirm that a specific network traffic associated with a user request originates from an approved application associated with the user access system 102*a* and/or the platform system 104 following which the API authorizer 109*c* directs the API data-plane entry point 109*b* to activate a particular API for responding to the user request.

Furthermore, the network load balancer 110 coordinates, distributes, or otherwise manages a plurality of user requests to facilitate optimal operation of the platform system 104. For example, a plurality of users may simultaneously try to access the platform system 104. In such cases if computing resources associated with the platform system 104 are not managed or allocated appropriately, the platform system may perform inefficiently and/or potentially crash if overloaded. As such the network load balancer 110 determines the types of API calls being made to the analytics system from the user access system 102*a* and/or the $2^{nd}$ admin access system 102*c* and ensures stability and/or seamless and/or optimal operation of the analytics system 106 by appropriately funneling said API calls to the analytics system in an efficient manner.

It is appreciated that the platform system 104 may be associated with a plurality of computing networks including: a first network through which a first user (e.g., admin or non-admin user) can access the platform system 104 via the user access system 102*a*; a second network through which a second user (e.g., a first admin user) can access the platform system 104 via a $1^{st}$ admin access system 102*b*; and a third network through which a third user (e.g., second admin user) can access the platform system 104 via a $2^{nd}$ admin access system 102*c*. It is appreciated that one or more of the first network, or the second network, or the third network, or the network within which the platform system 104 is implemented, or any computing network associated with the network environment 100 can comprise a wired and/or wireless communication network that facilitates communication between one or more computing devices or systems within the network environment 100. Furthermore, the first network, the second network, the third network in combination with any computing network associated with the network environment 100 comprise a complex computing network with subsystems that are configured to interact with each other in a plurality of different ways.

In one embodiment, the aforementioned networks include one or more of an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

Turning back to FIGS. 1A and 1B, the $1^{st}$ admin access system 102*b* may be used by an admin user who manage or otherwise monitors operations (e.g., technical operations) of the one or more systems or subsystems associated with the platform system 104. For example, the $1^{st}$ admin access system 102*b* may be used to monitor the analytics system 106 via the operations monitoring system 105*a*, the metrics monitoring system 105*b*, and/or the alerts monitoring system 105*c*.

According to one embodiment, an admin user (e.g., an admin user that is similar to or different from the admin user discussed in association with the $1^{st}$ admin access system 102*b*) may be authenticated by a $2^{nd}$ authentication system 103*b* prior to being provided access to the platform system 104. Furthermore, the $1^{st}$ authentication system 103*a* may be separated or isolated from the $2^{nd}$ authentication system to beneficially allow monitoring and/or managing of user categories and/or user privileges associated with accessing the platform system 104.

After authentication via the $2^{nd}$ authentication system, an admin user may access the platform system to submit requests including data requests associated with expanding, minimizing, or contracting parametric lists comprising one or more parametric data objects. In one embodiment, each parametric data object has one or more degrees of freedom that dictate component expandability or contractability of each parametric data object. According to one embodiment, inputs from an admin user may inform the platform system 104 on how to customize each parametric data object and thereby appropriately respond to requests from an admin or non-admin user (e.g., a user using the user access system 102a). In some embodiments, the platform system 104 may automatically customizes each parametric data object without input from an admin user. Furthermore, the admin user may authorize various admin or non-admin users associated with a specific computing network to execute one or more computing operations associated with the platform system 104. In addition, the admin user may also submit data inputs that can be used by data partner systems (e.g., not shown) to ensure that data associated with the parametric lists are up-to-date and are useable to provide appropriate feedback to admin or non-admin users. It is appreciated that operations executed using the $2^{nd}$ admin access system may be recorded or otherwise organized (e.g., organized as cloud data packages) by the user content distribution system 112b and stored at the admin content storage system 113b.

Turning back to the analytics system 106 shown in FIGS. 1A and 1B, it is appreciated that a plurality of dynamic container services 111a . . . 111n may be comprised in the analytics system 106 such that each of the plurality of dynamic container services can execute one or more analysis operations and/or fulfil data requests based on inputs from the user access system 102a, the $1^{st}$ admin access system 102b, and the $2^{nd}$ admin access system 102c. In one embodiment, the analytics system may provide location data of one or more parametric lists associated with the platform system 104. The analytics system 106 may also enable the extraction of specific parametric lists and generate one or more multi-dimensional images for extracted parametric lists as the case may require. Furthermore, the analytics system may automatically adapt data comprised in one or more parametric lists based on one or more inputs from the user access system 102a and/or the $2^{nd}$ admin access system. According to one embodiment, the dynamic container services 111a . . . 111n can expand or contract as needed to adapt operations of the platform system 104 dynamically and optimally as needed. In addition, the analytics system 106 may be coupled to a plurality of resources including a message broker system 118a, a structured database 116, a dynamic cache system 114, a messaging system 118b, and an analytics content storage system 113c.

The message broker system 118a orchestrates or coordinates stepwise or stage-wise or the logical progression of each request from the user access system 102a and/or from the $1^{st}$ admin access system 102b and/or from the $2^{nd}$ admin access system. The structured database 116 beneficially comprises a plurality of benchmark data used to guide or otherwise confirm that data operations being executed by the analytics system are within optimal or appropriate operation thresholds. The dynamic cache system 114 facilitates speedily reading and writing data to one or more of the structured database 116 and/or to the analytics content storage system 113c. The messaging system 118b beneficially facilitates electronically (e.g., via text, email, etc.): receiving requests from third-party systems 120a . . . 120n by the platform system 104; and/or receiving requests comprised in electronic messages from the user access system 102a by the platform system 104; and/or receiving electronic messages from the $1^{st}$ admin access system 102b by the platform system 104; and/or receiving electronic messages from the $2^{nd}$ admin access system 102c by the platform system 104. For example, the $3^{rd}$ party systems may access the platform system 104 via one or more APIs (not shown) to deliver requests to the analytics system 106 via the messaging system 118b. It is appreciated that operations data generated by the analytics system 106 may be recorded or otherwise organized (e.g. organized as cloud data packages) and stored on the analytics content storage system 113b.

In some embodiments, one or more subsystems comprised in the network environment 100 include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, and/or the like. In addition, the computing device may include various elements of a computing environment as described in association with the computing environment of FIGS. 2 and 3. For example, the computing device may include processing unit, a memory unit, an input/output (I/O) unit, and/or a communication unit which are all discussed in association with FIGS. 2 and 3.

In one embodiment, one or more data engines may be comprised in one or more systems or subsystems of the network environment 100 shown in FIGS. 1A and 1B. For example, the one or more data engines may be implemented in one or more computing devices comprised in the network environment 100. According to one embodiment, the one or more data engines may coordinate or work together to execute one or more computing processes or operations associated with the network environment 100. It is appreciated that the one or more data engines may include instructions or computing logic that are executed by the one or more processors of the network environment 100. In particular, the one or more data engines facilitate executing the processing procedures, methods, techniques, and workflows provided in this disclosure. Some embodiments include an iterative refinement of one or more data models (e.g., an artificial intelligence engine model, a machine learning model, a learning model, a large language model, etc.) associated with the network environment 100 disclosed via feedback loops executed by one or more computing device processors and/or through other control devices or mechanisms that make determinations regarding optimization of a given action, template, or model.

In some embodiments, the one or more data engines may access an operating system of a computing device comprised in the network environment 100 in order to execute the disclosed techniques. For instance, the one or more data engines may gain access into an operating system associated with the network environment 100 to initiate the various processes disclosed.

According to one embodiment, one or more of the user content storage system 113a, admin content storage system 113b, analytics content storage system 113c, and the structured database system 116 can comprise one or more storage devices that store data, information and instructions used by the various subsystems of the network environment 100 shown in FIGS. 1A and 1B. The stored information may include information about users, information about data models (e.g., learning model, an artificial intelligence model, etc.), information about parametric lists, information about parametric data objects, information about degrees of freedom associated with parametric data objects, information about analysis operations executed by the one or more data engines, information associated with components comprised in parametric data objects, etc. In one embodiment, the one or more storage devices mentioned above can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or some other mass storage device for storing information on a more permanent basis.

It is appreciated that the user access system 102a and/or the $1^{st}$ admin access system 102b and/or the $2^{nd}$ admin access system 102c can comprise one or more voice detection systems or one or more gesture detection systems that are configured to receive voice inputs and/or gesture inputs and thereby transmit requests or commands to the platform system 104. The one or more voice detection systems or one or more gesture detection systems associated with the user access system 102a and/or the $1^{st}$ admin access system 102b and/or the $2^{nd}$ admin access system 102c can, for example, receive voice data or gesture data from a user, parse the received voice or gesture data from the user to determine commands or requests contained therein using a speech processing or gesture processing engine, extract said determined commands or requests, and transmit said commands or requests to the platform systems to, for example, execute computing operations associated with requests or commands from the user. In one embodiment, the one or more voice detection systems may comprise computing systems adapted to detect and/or interpret human voice data and/or non-human voice data. Similarly, the one or more gesture detection systems, according to some implementations, comprise computing systems adapted or otherwise configured to recognize and/or interpret human and/or non-human gestures including visible motions or actions taken by, for example, human hands, human faces, or actions taken by other parts of the human body.

Figure 3:
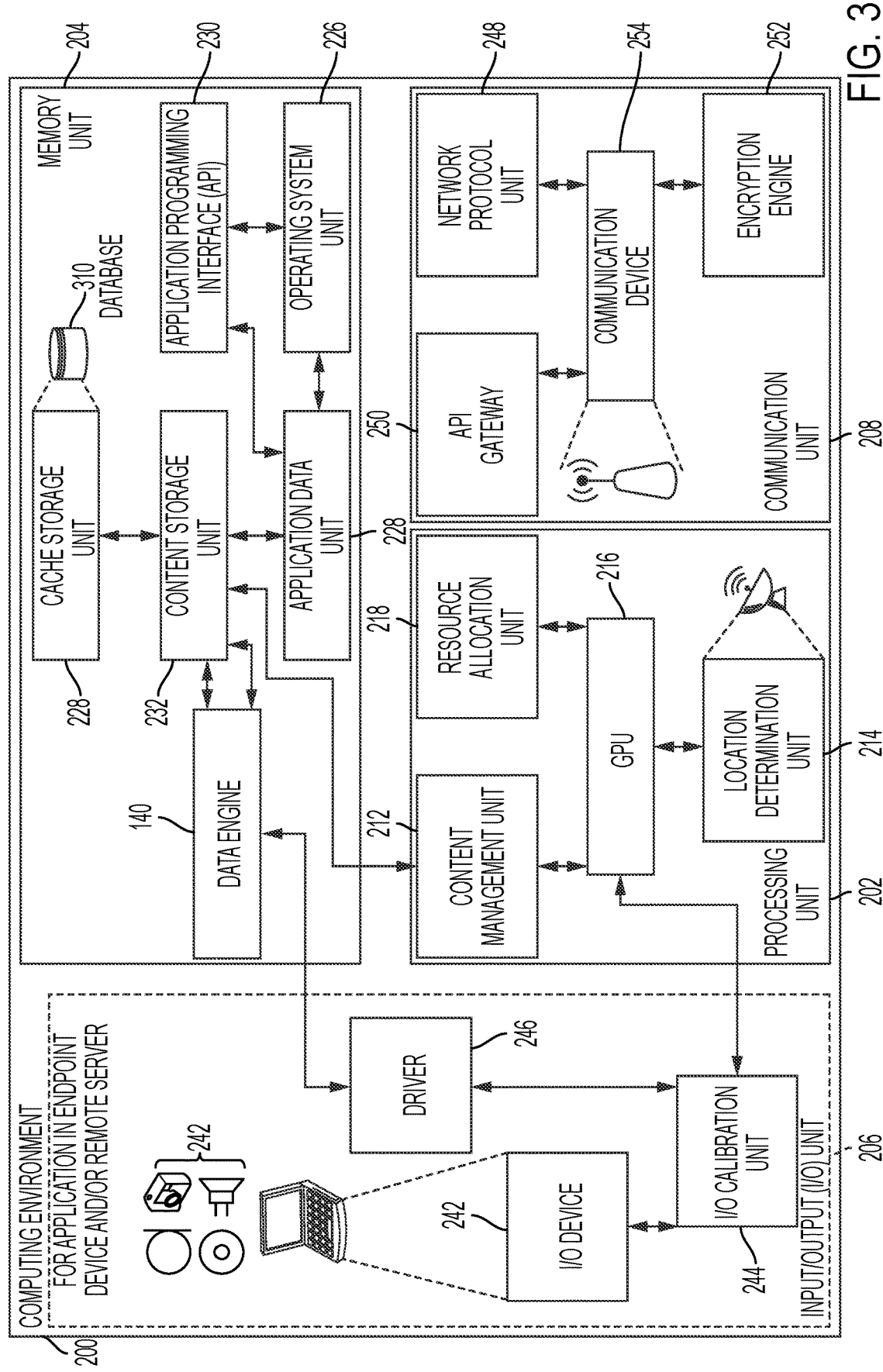

It is appreciated that the one or more voice detection systems or the one or more gesture detection systems may comprise input devices (see input/output (I/O) unit 206 of FIG. 3) such as microphones, video cameras, and/or voice or image processing engines as the case may require. The one or more voice detection systems or one or more gesture detection systems may comprise or be comprised in any of the other systems, apparatuses, devices, networks, described in this disclosure. In some embodiments, any element, feature, or embodiment, described in this disclosure, may be combined with any other element, feature, or embodiments described in this disclosure.

Exemplary Computing Environment

Figure 2:
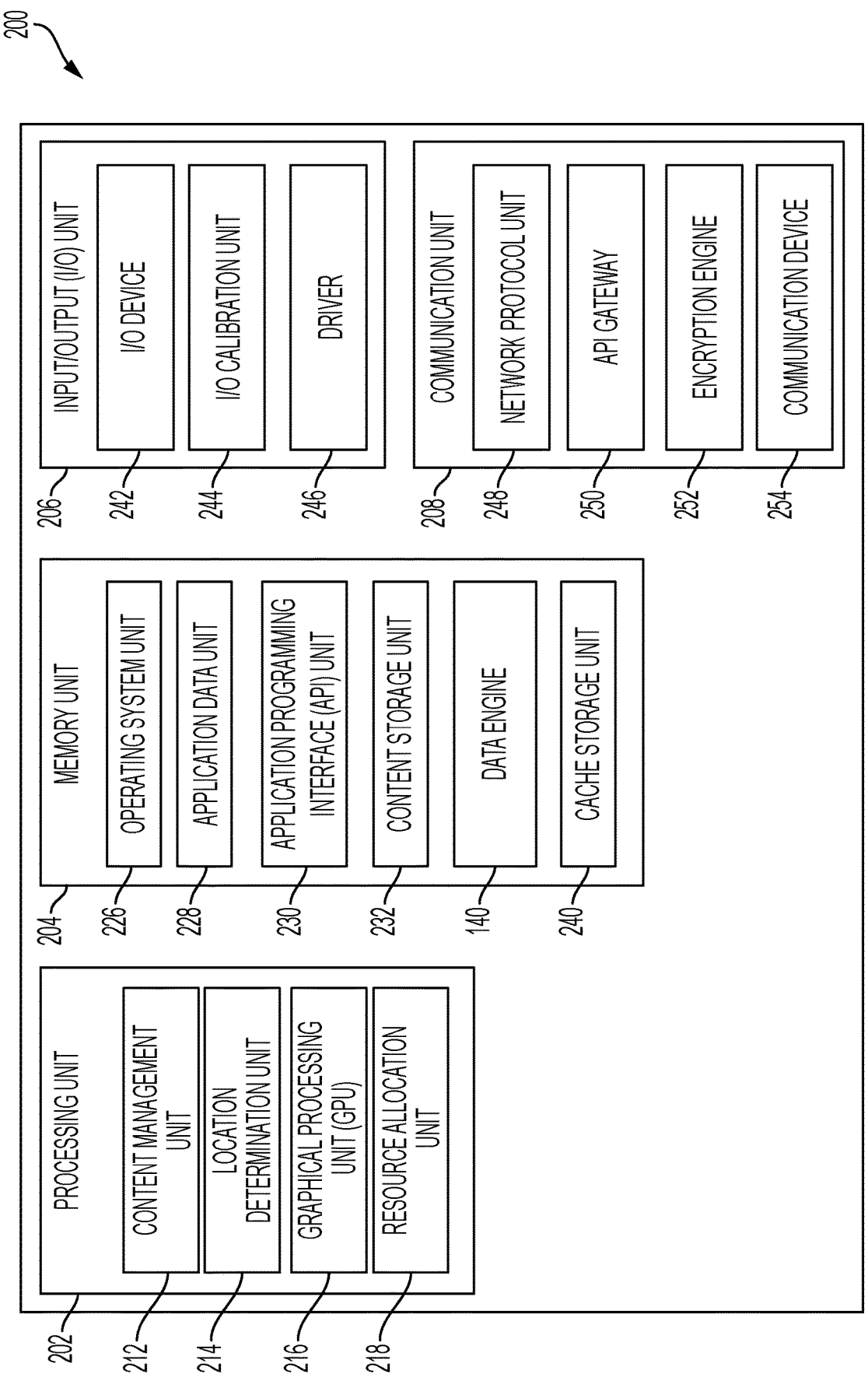
FIGS. 2 and 3 illustrate exemplary functional and system diagrams, respectively, of a computing environment for implementing one or more systems comprised in the network environment of FIGS. 1A and 1B.

FIGS. 2 and 3 illustrate exemplary functional and system diagrams of a computing environment 200 for implementing one or more systems or subsystems of the network environment 100. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other via, for example, a computing network. The computing environment 200 may be implemented on general-purpose hardware and/or specifically-purposed hardware as the case may be. In particular, the computing environment 200 and any units and/or subunits of FIGS. 2 and/or 3 may be included in one or more subsystems of the network environment 100.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the network environment 100. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., network system of FIGS. 1A and 1B). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, content associated with a parametric list or a parametric data object, media content, security event content, or any combination thereof. In some instances, content on which the content management unit 212 may operate includes device information, user profile data, user interface data, image data, text data, themes data, audio data or audio files, video data or video files, documents, and/or the like. Additionally, the content management unit 212 may control the audio-visual environment and/or appearance of application data during execution of various processes disclosed herein. In some embodiments, the content management unit 212 may interface with a third-party content server (e.g., third-party content server associated with the network systems 130a ... 130n), and/or specific memory locations for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information digitally.

The GPU 216 may facilitate generation, modification, analysis, processing, transmission, and/or presentation of content described above, as well as any data described herein. In some embodiments, the GPU 216 may be used to render content for presentation on a computing device (e.g., via a web application). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data, to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the various storage systems referenced in FIGS. 1A and 1B. Additionally or alternatively, one or more secondary databases located remotely from computing environment 200 may be used and/or accessed by memory unit 204.

Turning back to FIG. 2, the memory unit 204 may include subunits such as an operating system unit 226, an application data unit 228, an API unit 230, a content storage unit 232, data engine 140 (e.g., comprising one or more data engines), and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as the one or more data engines referenced above.

The operating system unit 226 may facilitate deployment, storage, access, execution, and/or utilization of an operating system used by computing environment 200 and/or any other computing environments described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. One or more computing devices of the network environment 100 may be required to download, install, access, and/or otherwise use a software application (e.g., a web application) to facilitate implementing the disclosed techniques. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable various computing systems external to the platform system 104 to communicate or otherwise submit requests and/or receive responses from the platform system 104. It is appreciated that the API unit 230 may facilitate accessing, using the data engine 140, one or more applications or services associated with the platform system 104.

The content storage unit 232 may facilitate deployment, storage, access, and/or utilization of information associated with performance of implementing operations associated with the network environment 100 and/or framework processes by computing environment 200 and/or any other computing environment described herein and/or framework processes by computing environment 200 and/or any other computing environment described herein. In some embodiments, content storage unit 232 may communicate with content management unit 212 to receive and/or transmit content files (e.g., media content, parametric list content, parametric data object content, digital data object content, command content, input content, computing security content, registration object content, etc.).

As previously discussed, the data engine 140 may comprise a plurality of data engines that facilitate executing the processing procedures, methods, techniques, and workflows provided in this disclosure. In particular, the data engine 140 may be configured to execute computing operations associated with the disclosed methods, systems/apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of one or more of the user access system 102a, the $1^{st}$ admin access system 102b, and/or the $2^{nd}$ admin access system 102c. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate c establishment, maintenance, monitoring, and/or termination of communications between computing environment 200 and other computing environments, third-party server systems, and/or the like. Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, power line communication (PLC) protocols, and/or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. In some embodiments, the API gateway 250 may be required to validate user credentials associated with, for example, the user access system 102a and/or the $2^{nd}$ admin access system 102c prior to accessing the API unit 230 by the authenticated user. The API gateway 250 may include instructions for the computing environment 200 to communicate with another computing device and/or between elements of the computing environment 200.

Exemplary Embodiments

Figure 4A:
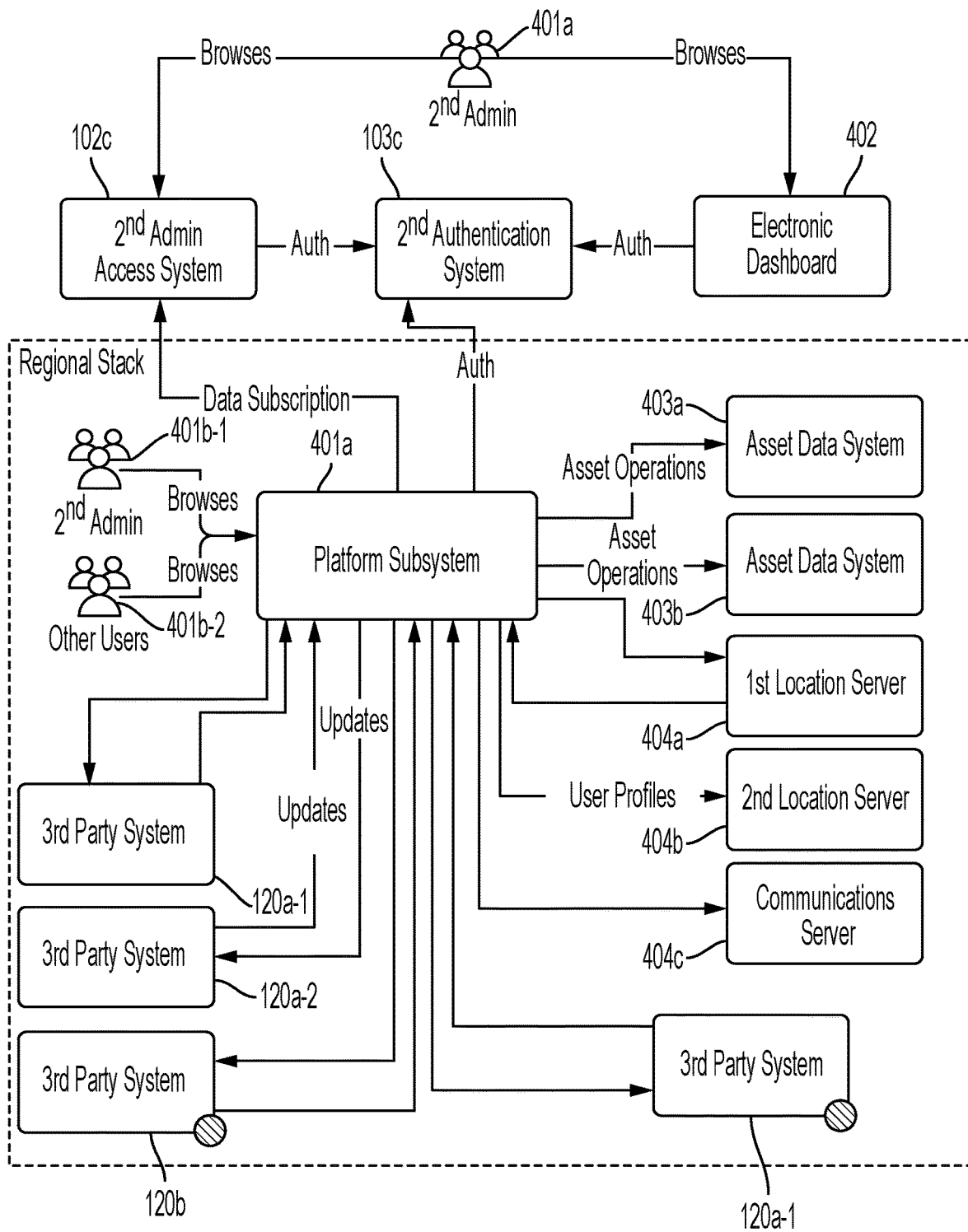
FIG. 4A shows an exemplary coupling of a plurality of systems to a platform subsystem associated with the platform system of FIGS. 1A and 1B.

FIG. 4A shows an exemplary coupling of a plurality of systems to a platform subsystem 401a associated with the platform system 104 of FIGS. 1A and 1B. According to one embodiment, a user (e.g., an admin user) may access the platform subsystem 401a via the $2^{nd}$ admin access system 102c by first being authenticated by the $2^{nd}$ authentication system 103c. Furthermore, the user may view, interact with, and/or analyze a plurality of multi-dimensional visualizations associated with computing operations executed by the platform subsystem 401a via the electronic dashboard 402.

Once authenticated, users (e.g., users 401b-1 and 401b-2, respectively) may directly access the platform subsystem 401a and submit a plurality of requests which may be analyzed or otherwise processed by the platform subsystem 401a. As part of fulling user requests, the platform subsystem may leverage a plurality of subsidiary subsystems including asset data systems 403a and 403b, location servers 404a and 404b, and a communications server 404c. According to one embodiment, one or more $3^{rd}$ party systems 120a-1, 120a-2, 120a-3, and 120b can also submit requests and/or interact with the platform subsystem 401a. Specific data requests and/or data processing operations associated with the platform subsystem 401a are discussed further below.

Figure 4B:
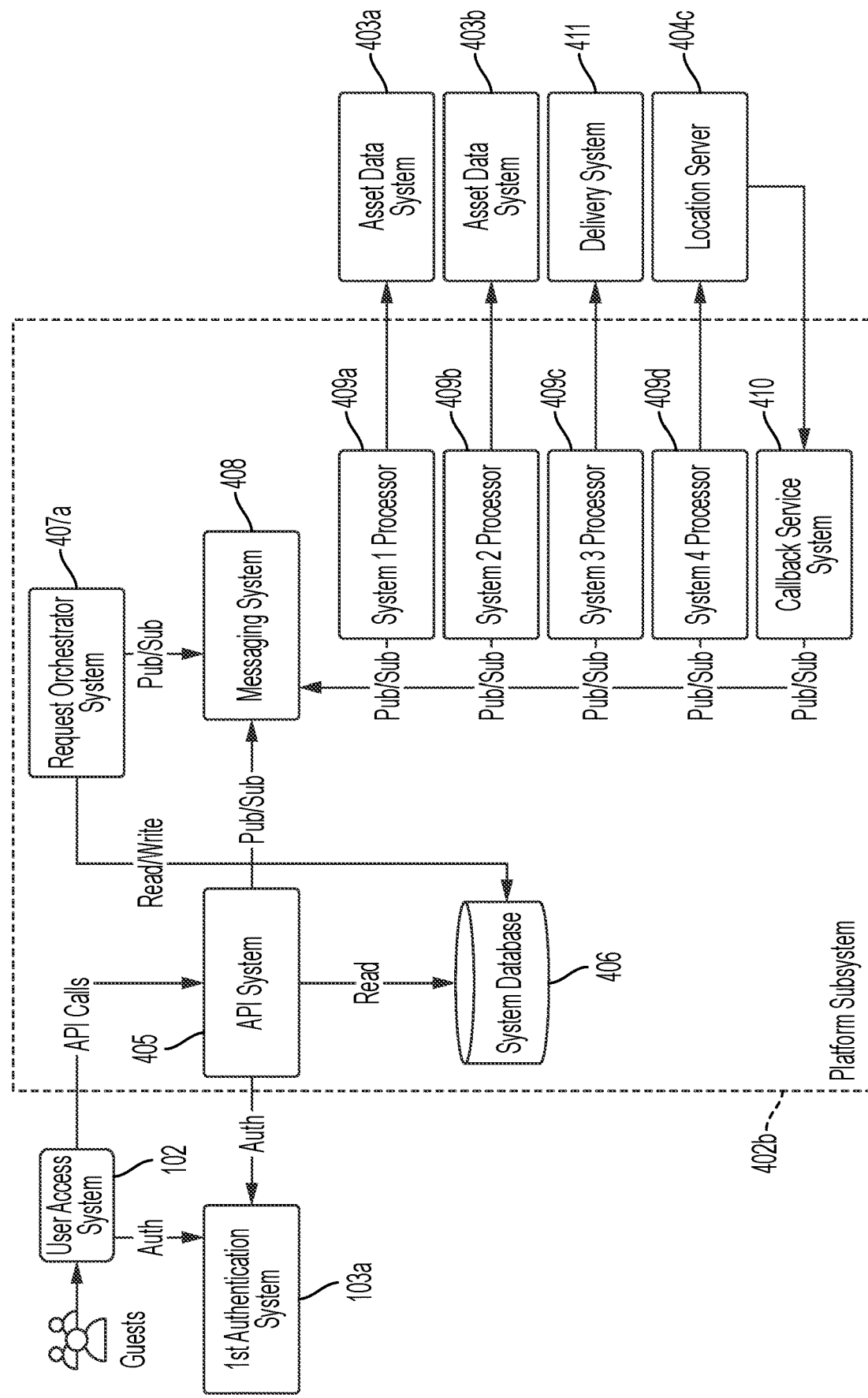
FIG. 4B shows an exemplary data flow between a user access system and a platform subsystem associated with the platform system of FIGS. 1A and 1B.

FIG. 4B shows an exemplary data flow between the user access system 102 and a platform subsystem 402b associated with the platform system 104. As shown in the figure, a user (e.g., guest user or non-admin user) may submit one or more requests associated with parametric lists and/or parametric data objects as the case may require. According to one embodiment, the user may first be authenticated by the $1^{st}$ authentication system 103a prior to being provided access to the platform subsystem 402b. It is appreciated that the requests submitted via the user access system 102 may be communicated via one or more application programming interfaces (APIs) that are funneled through the API system 405 such that the API system 405 identifies appropriate applications and/or appropriate data associated with the requests from the user access system and may execute read/write operations on a database system 406 associated with the platform subsystem 402b. In particular, the API system 405 may be used by platform subsystem 402b to extract and/or store relevant data and/or catalog relevant data including location data, device data, request data, etc.

According to one embodiment, the platform subsystem comprises a request orchestrator system 407a which is configured to logically sequence a plurality of requests from the user access system 102 or a plurality of user access systems to ensure that user requests or data requests from the user access system 102 or accurately and timely processed. In particular, the request orchestration system 407a may be configured to determine state data for each data request coming into the platform subsystem 402b in order to accurately sequence said data requests or logically organize data elements or commands comprised in the data requests and thereby facilitate accurate processing or analyzing of said data requests. Furthermore, the orchestrator system 407a may be configured to coordinate interactions between a plurality of systems comprised in the platform subsystem 402b in order to accurately process requests from the user access system 102.

In one embodiment, the requests from the user access system 103a and/or requests from $3^{rd}$ party systems may be comprised in an electronic message which is analyzed or otherwise processed by the messaging system 408. For example, the messaging system 408 may leverage a plurality of processor systems 409a . . . 409d to process data requests comprised in the electronic message. Furthermore, at least one processor (e.g., processor system 104d) may be configured to validate and/or confirm one or more data requests as the case may require. In addition, a callback service system 410 may also work with the messaging system to manage asynchronous callback computing operations associated with $3^{rd}$ party systems. It is appreciated that a plurality of support systems including asset data systems 403a and 403b, request delivery systems 411, and location server 404c may coordinate with one or more systems of the platform subsystem 402b to respond to user requests.

Figure 4C:
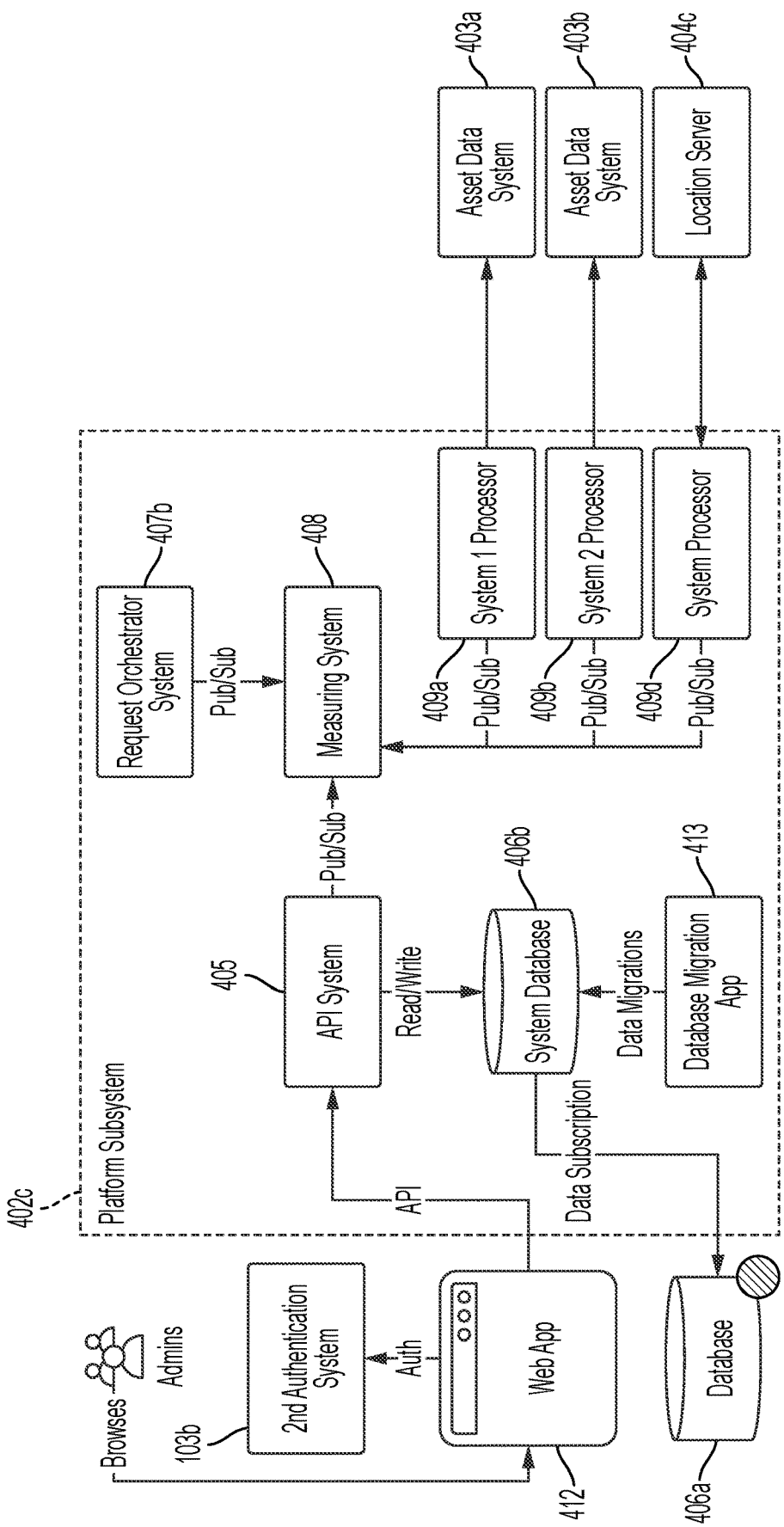
FIG. 4C shows an implementation where a user accesses a platform subsystem after being authenticated by the $2^{nd}$ authentication system indicated in FIGS. 1A and 1B.

FIG. 4C shows an implementation where a user (e.g., an admin user) accesses a platform subsystem 402c after being authenticated by the $2^{nd}$ authentication system 103b. As seen in the figure, the user may access a web application 412 and provide credential data which the $2^{nd}$ authentication system 103b uses to grant or deny the user access to the platform subsystem 402c. Following authentication, the user may interact with the platform subsystem 402c via the web app 412 using one or more APIs that are connected to the API system 405. Based on the requests from the user, the API system 405 beneficially identifies the appropriate applications and/or other computing resources including necessary data that can be extracted from or copied to the databases systems 406a and 406b. According to one embodiment, the web application 412 allows a user to manage location data associated with a plurality of parametric lists, analysis data associated with the parametric lists, analysis data associated with parametric data objects, etc. As previously noted, the database systems 406a and 406b may be configured to store and/or catalog the aforementioned data. It is appreciated that a database migration application 413 may be used to control schematic updates to the database systems 406a and/or 406b. The request orchestrator system 407b and the messaging system 408 function similarly as the request orchestrator 407a and the messaging system 408 referenced above in FIG. 4B. The processor systems 409a . . . 409d as well as the asset data systems 403a . . . 4b and the location server 404c of FIG. 4C function similarly to the processor systems 409a . . . 409d as well as the asset data systems 403a . . . 4b and the location server 404c of FIG. 4B.

Figure 4D:
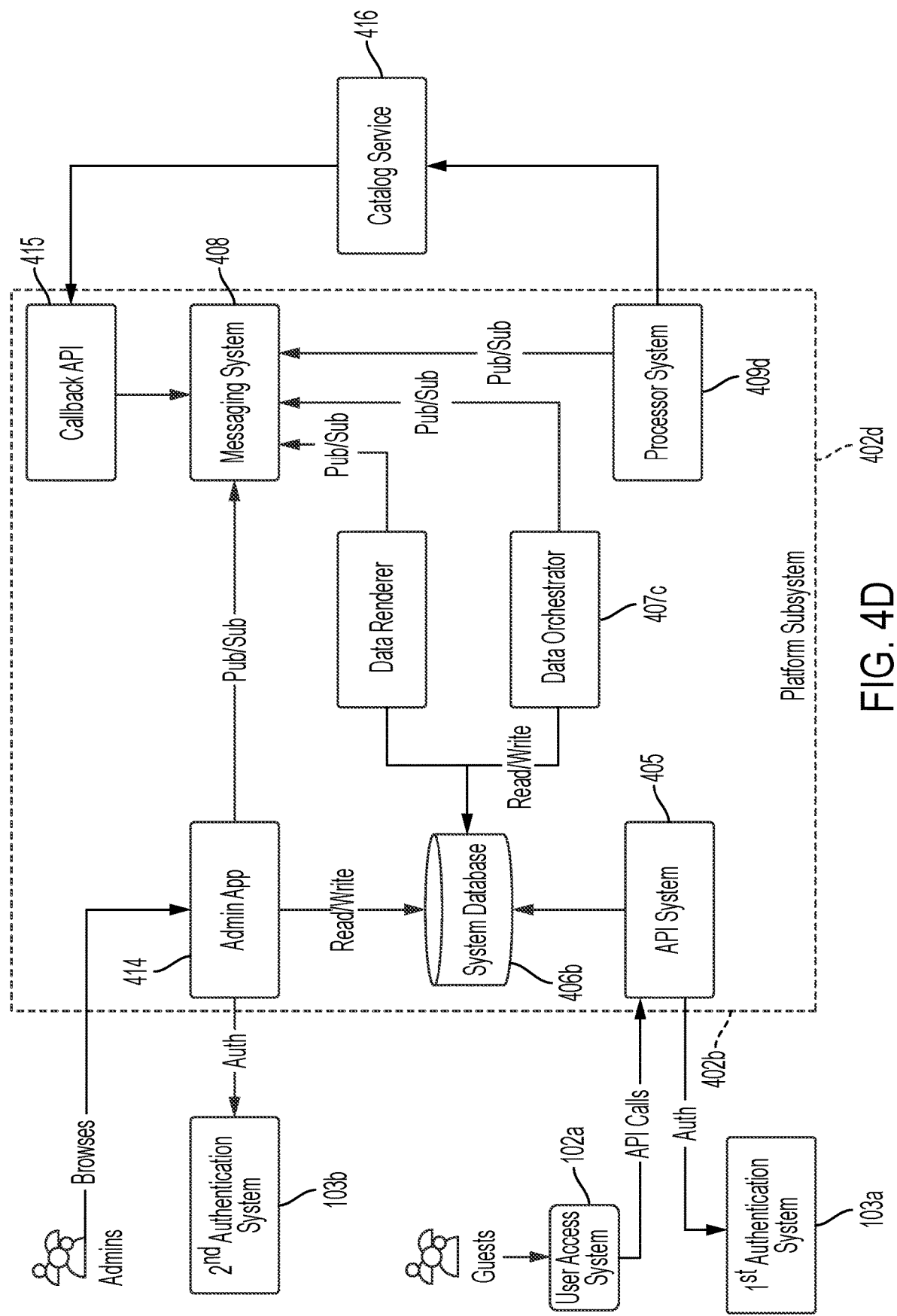
FIG. 4D shows an implementation where two users access a platform subsystem associated with the platform system of FIGS. 1A and 1B.

FIG. 4D shows an implementation where two users (e.g., admin or non-admin users) access a platform subsystem 402d associated with the platform system 104 of FIGS. 1A and 1B. In this instance, a first user may be authenticated by the $1^{st}$ authentication system via the user access system 102a while an admin user is authenticated by the $2^{nd}$ authentication system 103b. The authentication of the first user and the admin user may be achieved via the API system 405 and the Admin App 414, respectively. Once authenticated, requests or responses generated from the first user may be bifurcated or otherwise divided and funneled through a data renderer system 107d and/or a data orchestrator system 407c which communicate with the messaging system 408. The messaging system 408 also interacts with a callback API 415 and at least one processor system 409d which are in turn communicatively coupled to a catalog service 416. It is appreciated that the implementation of FIG. 4D leverages admin inputs or other machine learning inputs to optimize and/or customize responses to requests from the first user.

Figure 4E:
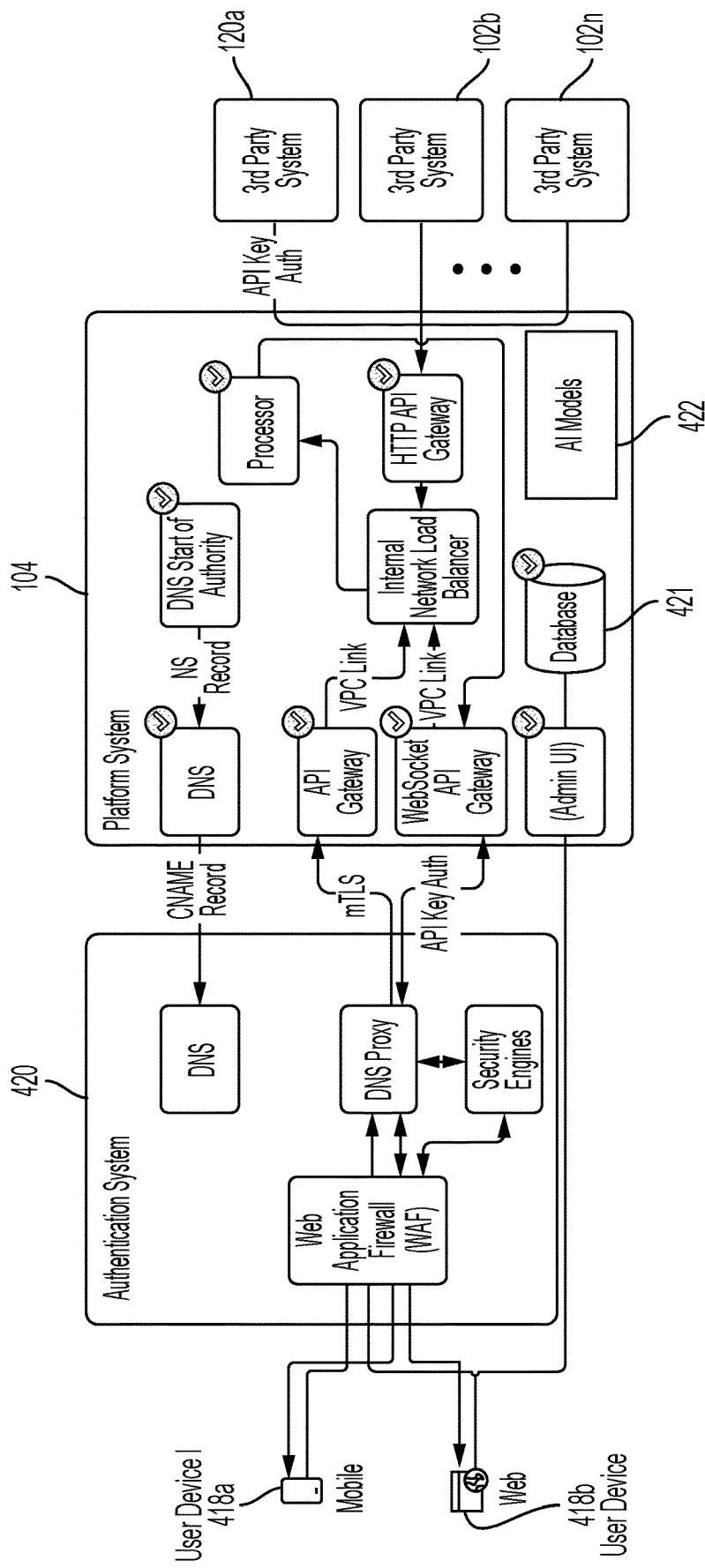
FIG. 4E shows a block diagram indicating an exemplary data flow within the platform system of FIGS. 1A and 1B.

FIG. 4E shows a block diagram indicating an exemplary data flow within the platform system 104 discussed above. A can be seen in the figure, a user (e.g., an admin or non-admin user) may access an authentication system 420 via user devices 418a or 418b. Following authentication, the user submits one or more requests to the platform system 104 and receives feedback from the platform system 104 accordingly. The feedback, for example, may include a plurality of visualizations associated with parametric lists, a plurality of visualizations associated with parametric data objects, a plurality of forms for receiving additional inputs from the user, etc.

It is appreciated that a plurality of $3^{rd}$ party systems 102a . . . 102n may interact with the platform system 104 as previously discussed. Furthermore, a database 421 may store a plurality of data associated with operations executed within the platform system 104. In addition, the platform system 104 may include a plurality of artificial intelligence models that are trained based on: the types of input requests associated with the parametric data objects being received by the platform system 104; the types of outputs generated by the platform system 104 based on processing said input requests; temporal data associated with receiving and processing said input requests by the platform system; quantitative and/or qualitative data associated with parametric lists based on specific geolocations associated with the platform system 104; quantitative and/or qualitative data associated with parametric data objects based on specific geolocations associated with the platform system 104, etc.

Figure 5A:
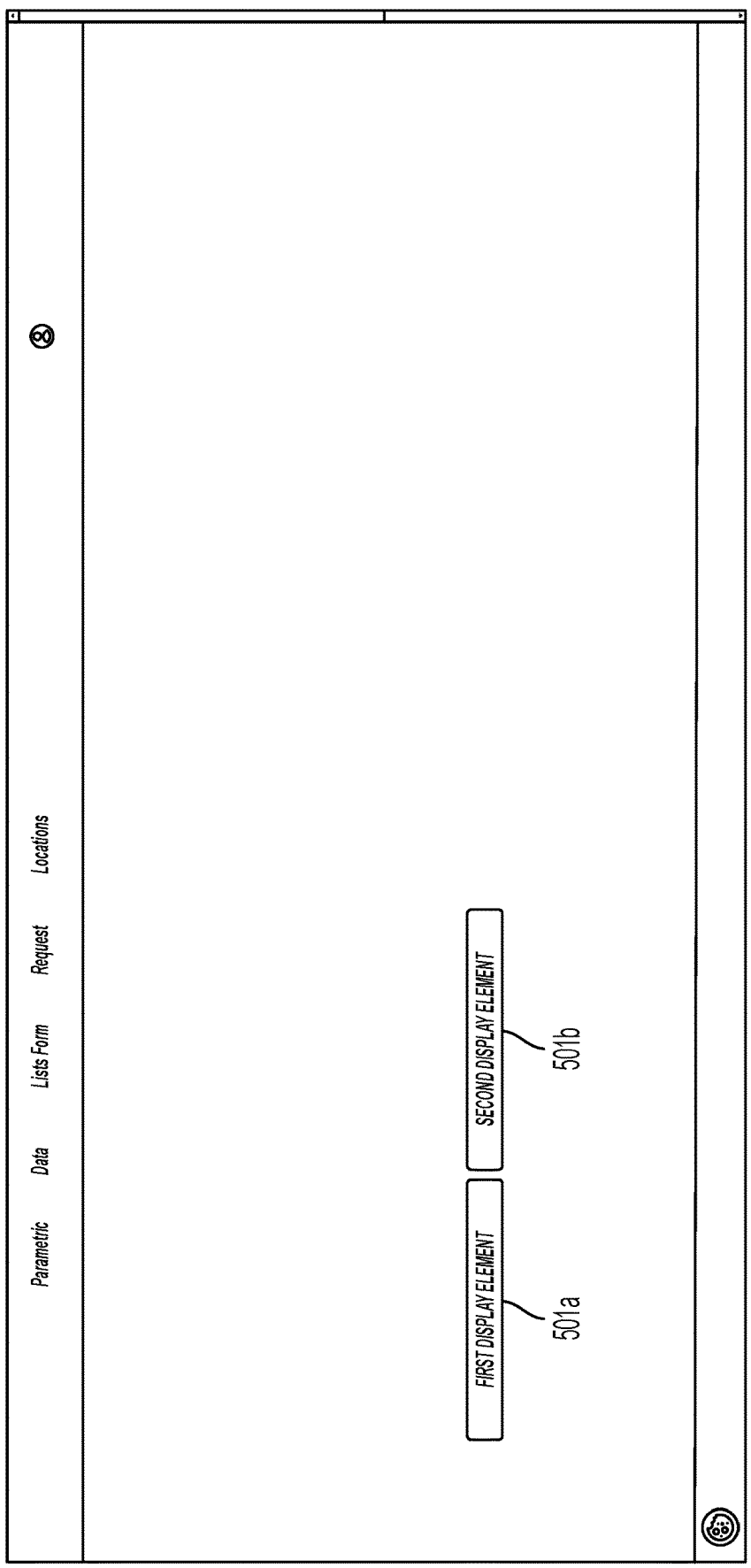

FIGS. 5A-5I indicate exemplary transitions of a plurality of interfaces based on user requests. In FIG. 5A a web application may be loaded on a user access system (e.g., user access system 102a) as a first visualization that provides a user access to the platform system 104. The first visualization may comprise a plurality of display elements such as the first display element 501a and the second display element 501b shown in the figure. According to one embodiment, the visualization of FIG. 5A may be generated on a graphical interface of the user access system in response to authenticating a user. In other embodiments, the user is authenticated during or after transitioning through at least one interface indicated in FIGS. 5A-5I.

Figure 5B:
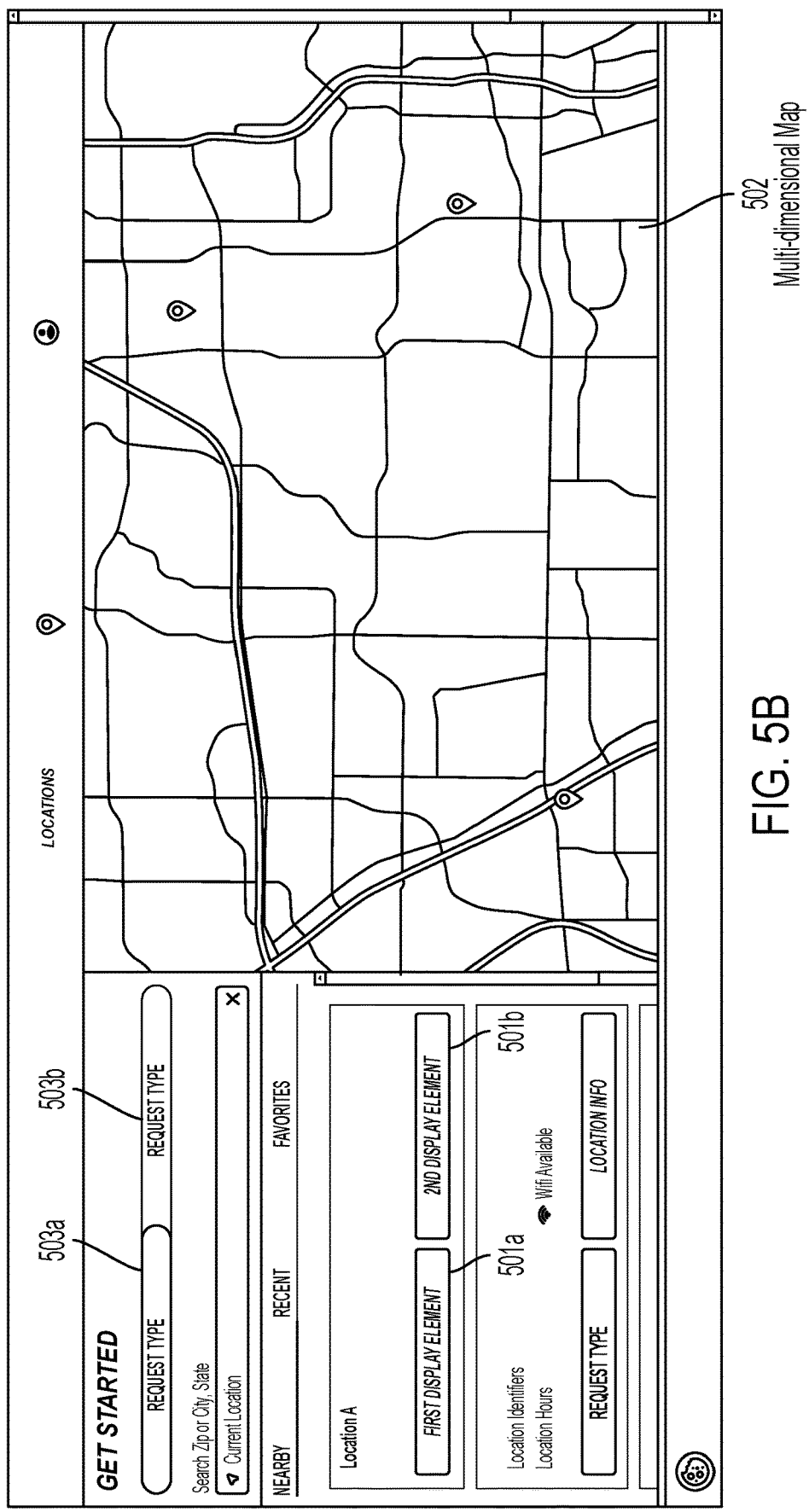
Figure 5C:
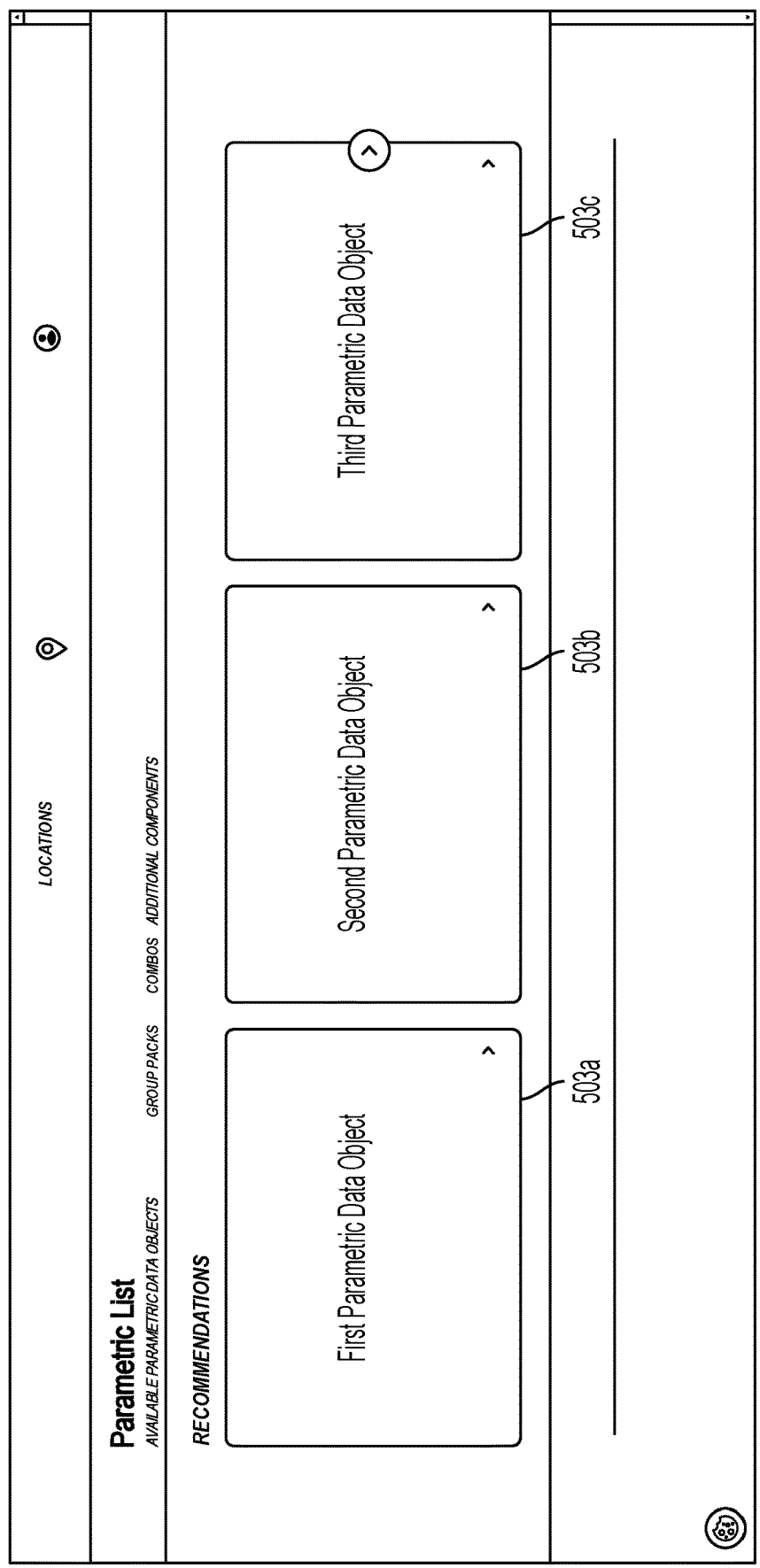

In response to activating at least one of the first display element 501a or the second display element 501b, the web application generates the visualization indicated in FIG. 5B. According to one embodiment, a multi-dimensional map 502 indicating a plurality of geographic locations or a plurality of networks associated with parametric data objects and/or parametric lists are generated for selection by the user. Upon selection of a given location comprised in the multi-dimensional map 502, the display elements 501a and 501b are activated for selection by the user to determine a communication channel of delivery for the user request. According to one embodiment, the visualization shown in FIG. 5B includes display elements 503a and 503b that indicate a request type associated with a user's request to inform one or more data systems comprised in the platform system 104 to begin adapting various configurations of the platform system 104 ahead of submission of the request from the user.

According to some embodiments, parametric list may be generated and displayed to the user based on the user's profile, historical requests made by the user, frequency data corresponding to one or more parametric lists associated with the platform system 104, temporal data indicating a time of day that the user's request is being submitted, inventory data corresponding to one or more parametric lists associated with the platform system 104, legacy data associated with volumetric requests by the user, etc. It is appreciated that the user may or may not select one or more parametric data objects 503a . . . 503c of FIG. 5C but may submit a separate request for either a different parametric list or a different set of parametric data objects.

Figure 5D:
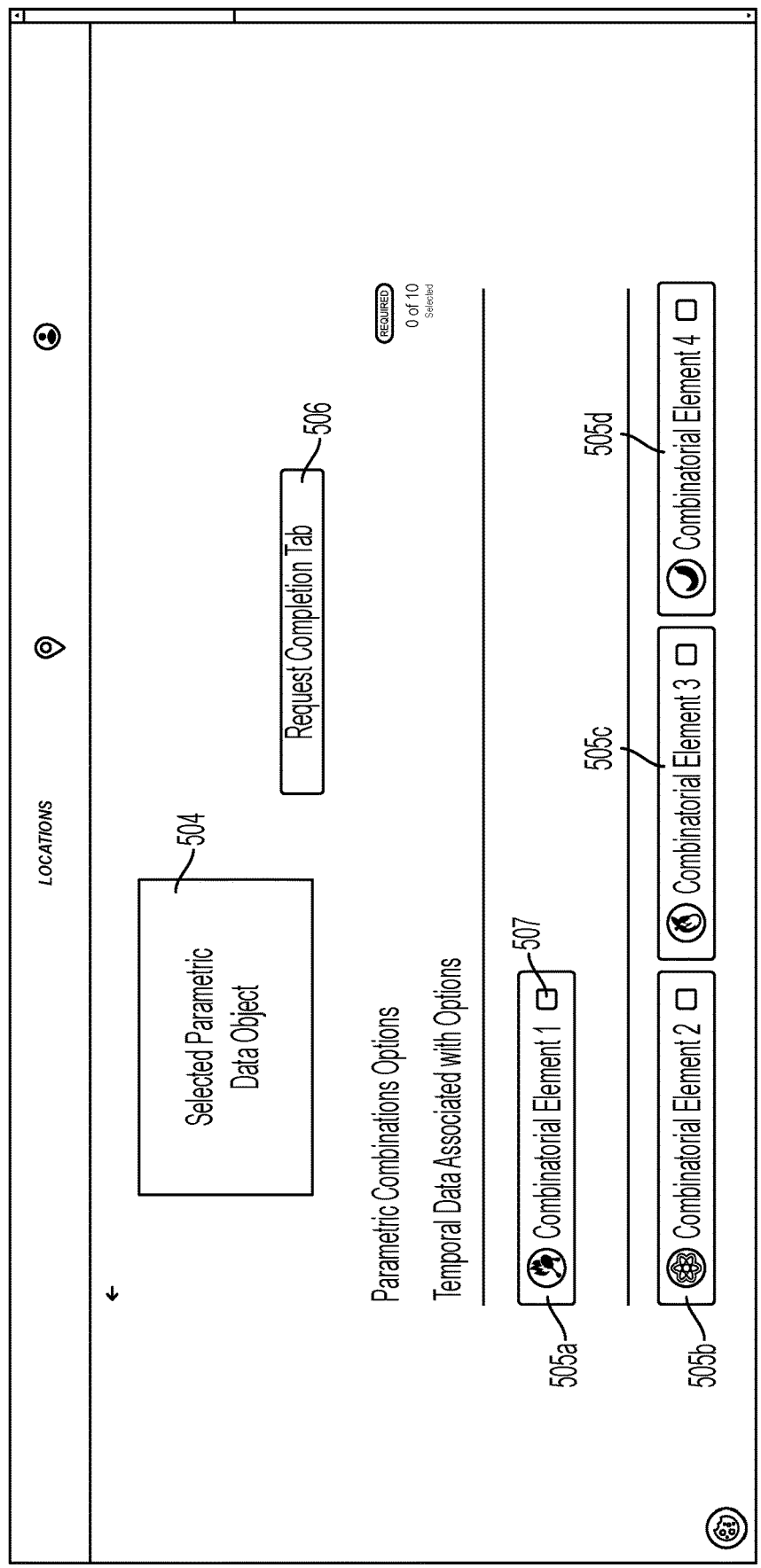

In FIG. 5D, a visualization associated with a selected parametric data object is provided for further configuration by the user. As seen in the figure, the user is provided a plurality of combinatorial data elements to customize or otherwise configure a given parametric data object based on one or more degrees of freedom associated with the parametric data object. For example, the user may select one or more combinatorial data elements 505a . . . 505d to further configure the selected parametric data object. In addition, the user may activate a request completion tab 506 upon selecting one or more combinatorial data elements 505a . . . 505d.

Figure 5E:
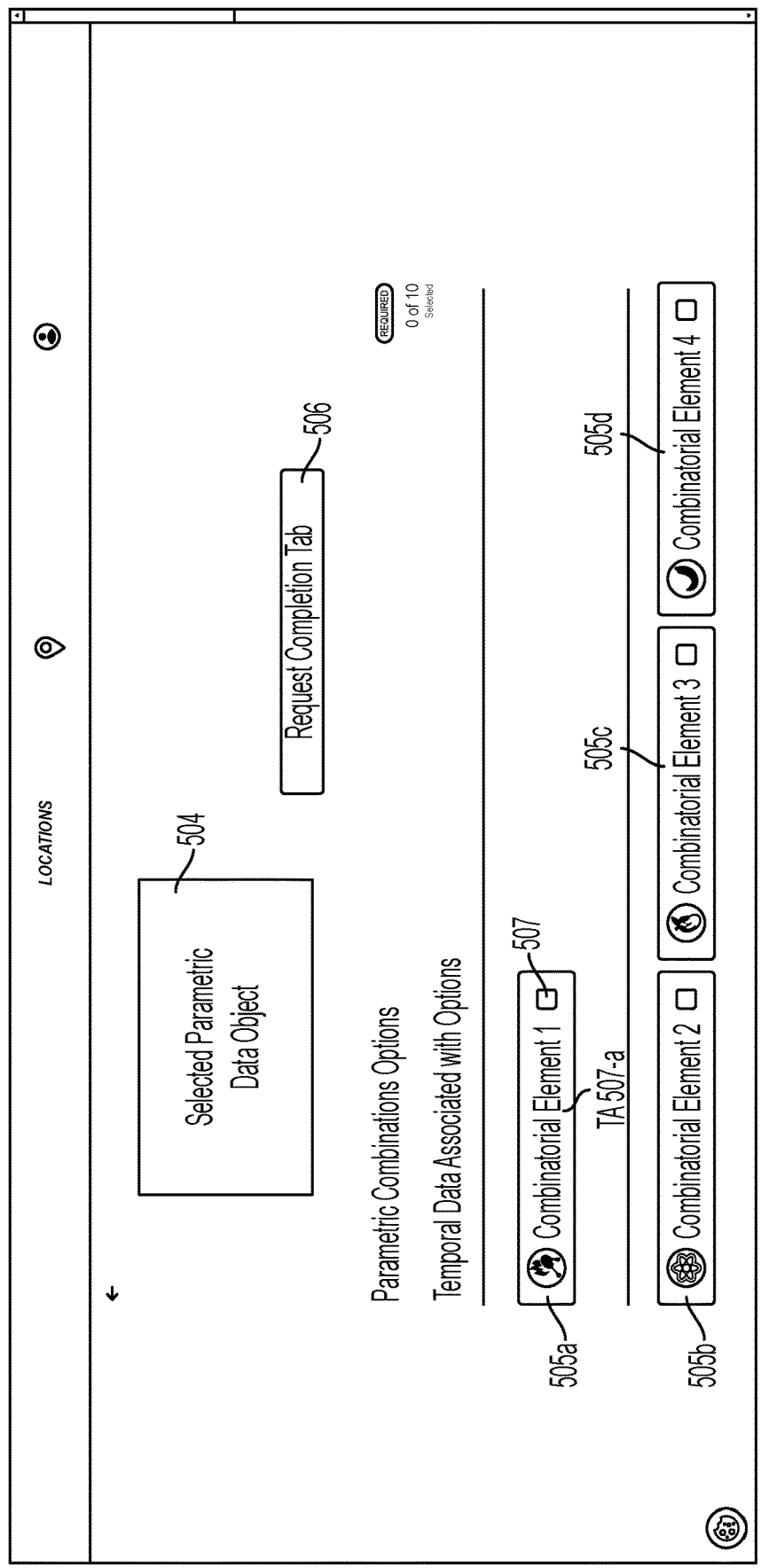
Figure 5F:
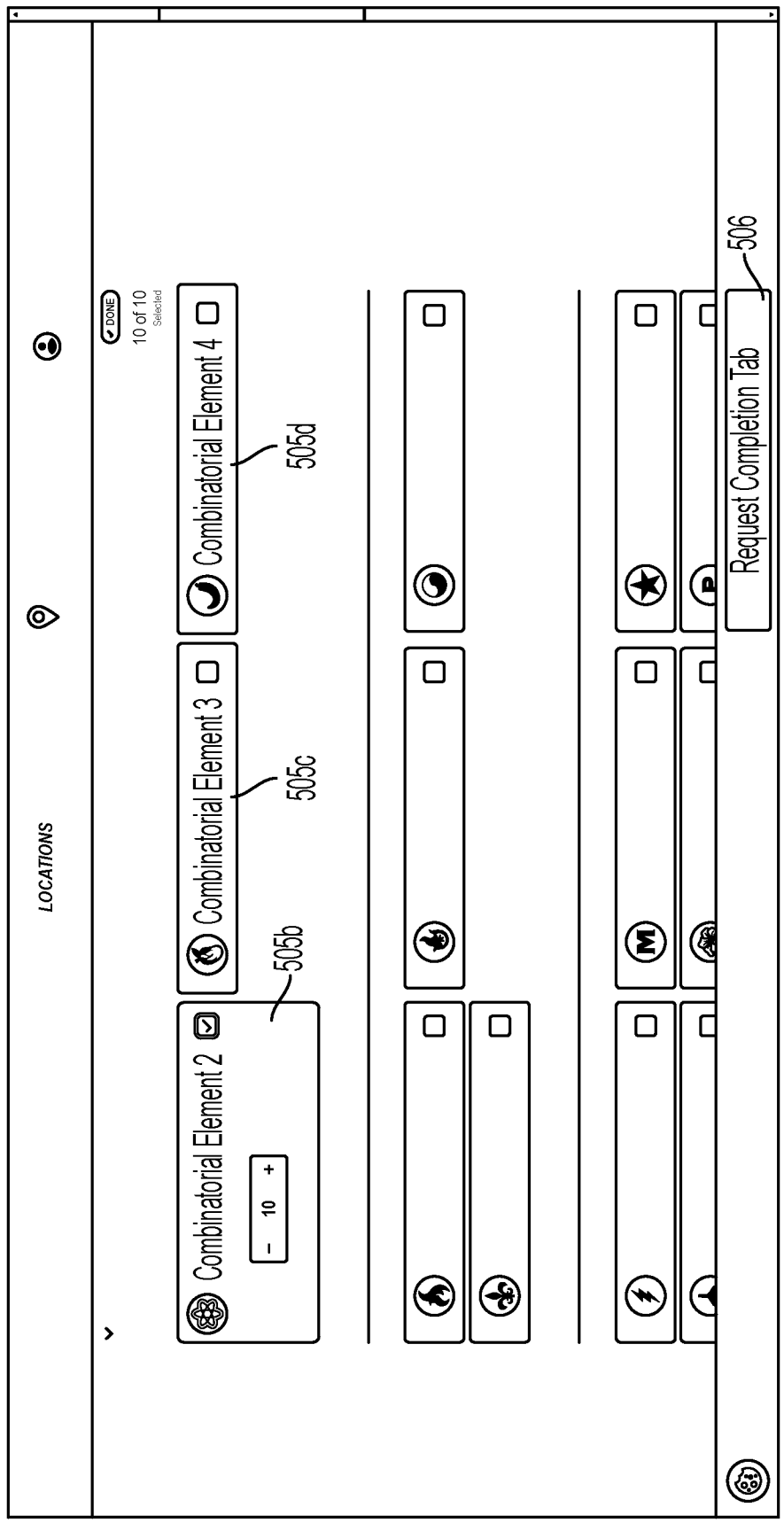

In FIG. 5E, the user selects the combinatorial element 505a via the radio buttons 507. Upon the selection, the platform system 104 may generate a message TA (e.g., display element 507-a) which indicates that the selected combinatorial data element 505a is temporarily unavailable. The platform system 104 may automatically generate advise the user to select other combinatorial data elements including combinatorial data elements 505b . . . 505d as shown in FIG. 5F. According to one embodiment, other combinatorial data elements not shown may be provided to the user to further configure the selected parametric data object. After selecting one or more combinatorial data elements, the user may activate a request completion tab 506 to transmit a request to the platform system 104.

Figure 5G:
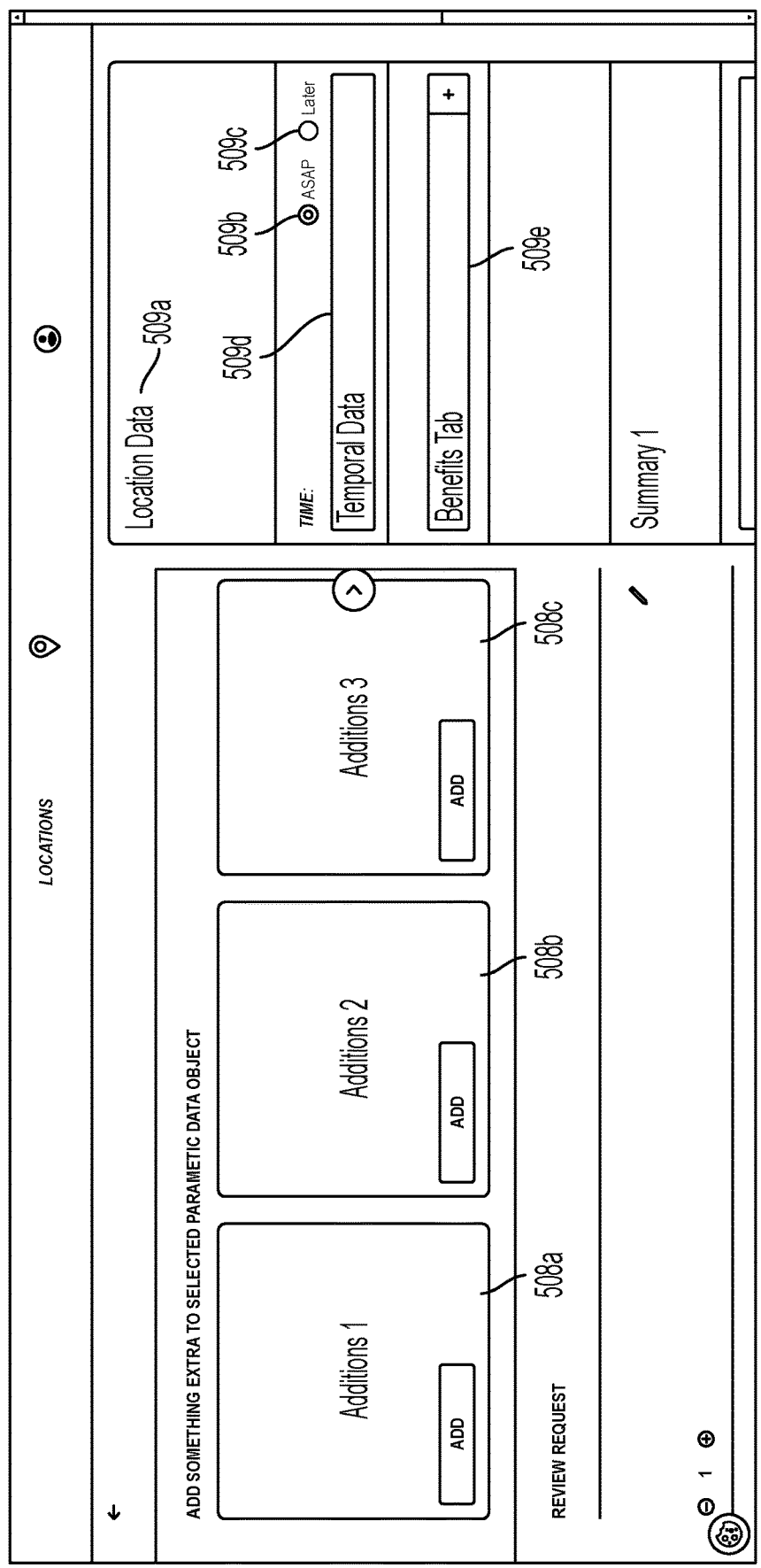

After transmitting the request, the platform system 104 may transmit data used to adapt the visualization shown in FIG. 5G that comprises a first summary based on the user's request and provides additional components 508a . . . 508c for selection by the user. In one embodiment, the visualization includes location data 509a associated with a location from which the user request will be processed, temporal data 509b, 509c, and 509d to the user, and a benefits tab 509e, all of which can comprise radio buttons that are selectable by the user.

The platform system 104 may further generate data for customizing a second summary based on the user's request with or without options for adding additional components or combinatorial elements as the case may require. FIG. 5H provides an exemplary visualization of the second summary and includes a plurality of fields 510a . . . 510d for receiving user identification information following which the user can select the request activation tab 511 to transmit data comprised in one or more of the first summary visualization or the second summary visualization to the platform system for processing. Upon selection of the request activation tab 511, the platform system transmits data to the user access system, which is used to format, customize, or generate the visualization shown in FIG. 5I. According to one embodiment, the visualization of FIG. 5I includes an estimated completion time 512 for the user request to be processed, a request reference identifier 513 associated with the user request, and a third summary 514 indicating a components or combinatorial elements comprised in each parametric data object associated with the request.

Figure 6A:
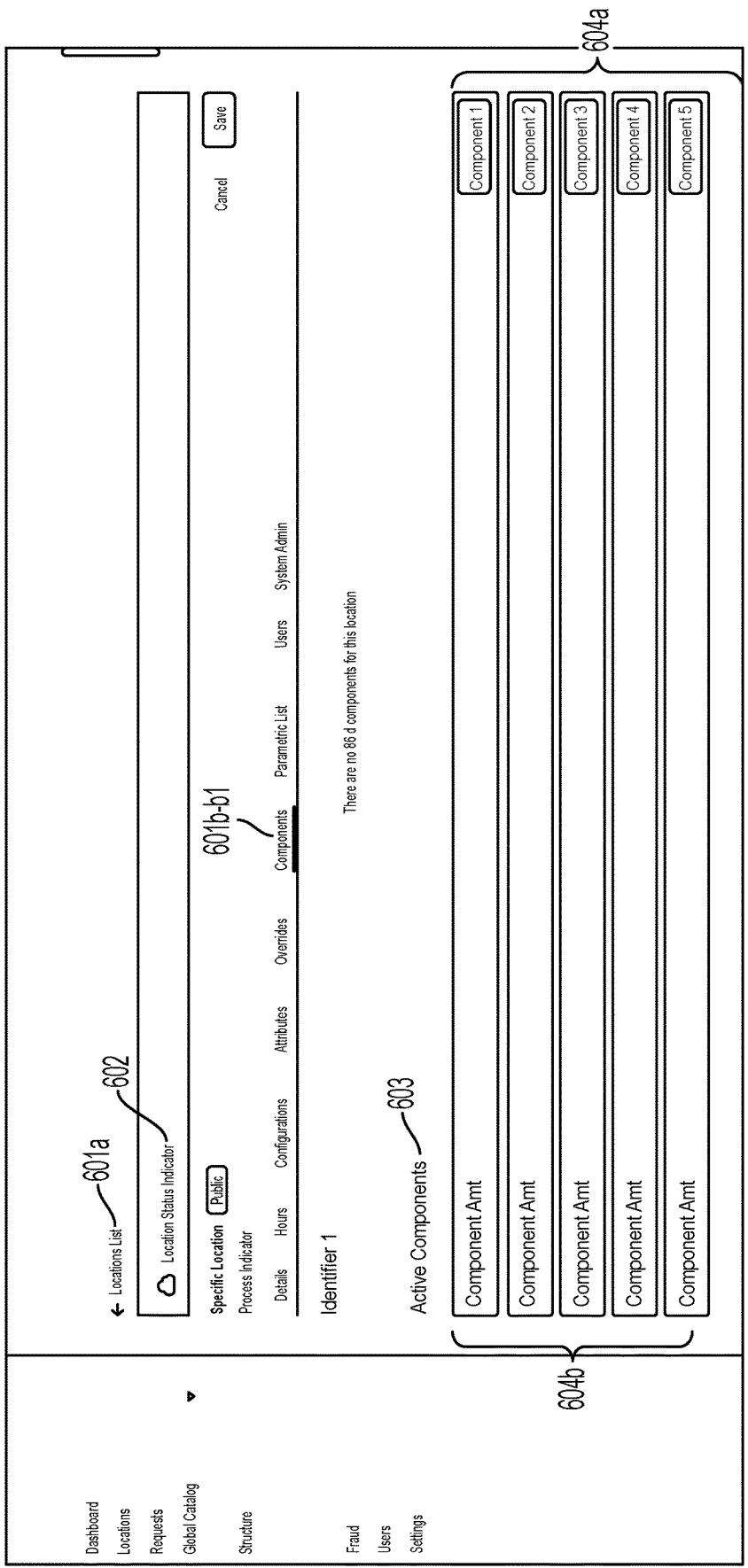
FIG. 6A-6R show exemplary visualizations associated with a web application that enables a user to access the platform system of FIGS. 1A and 1B.
Figure 6B:
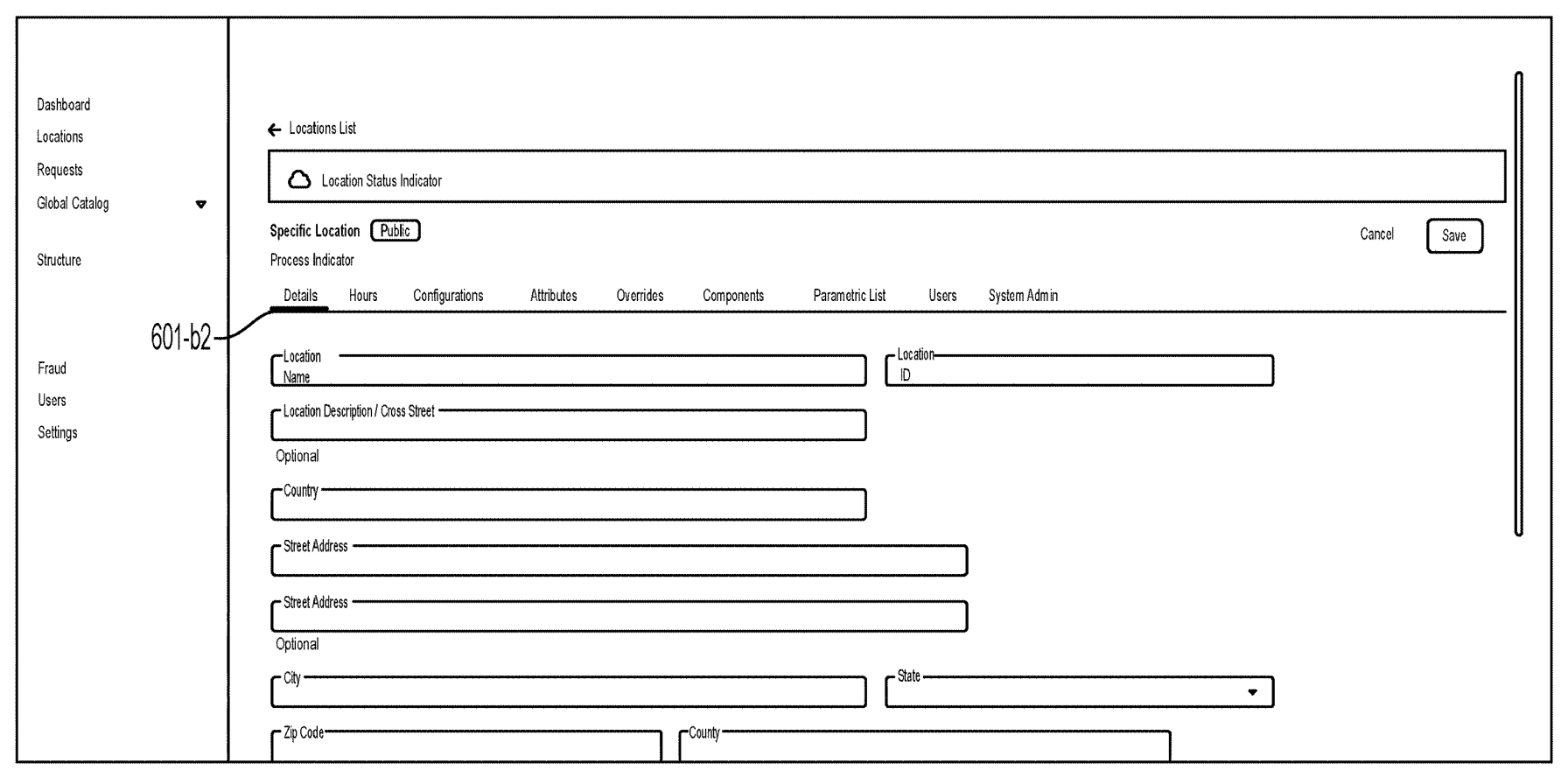
Figure 6C:
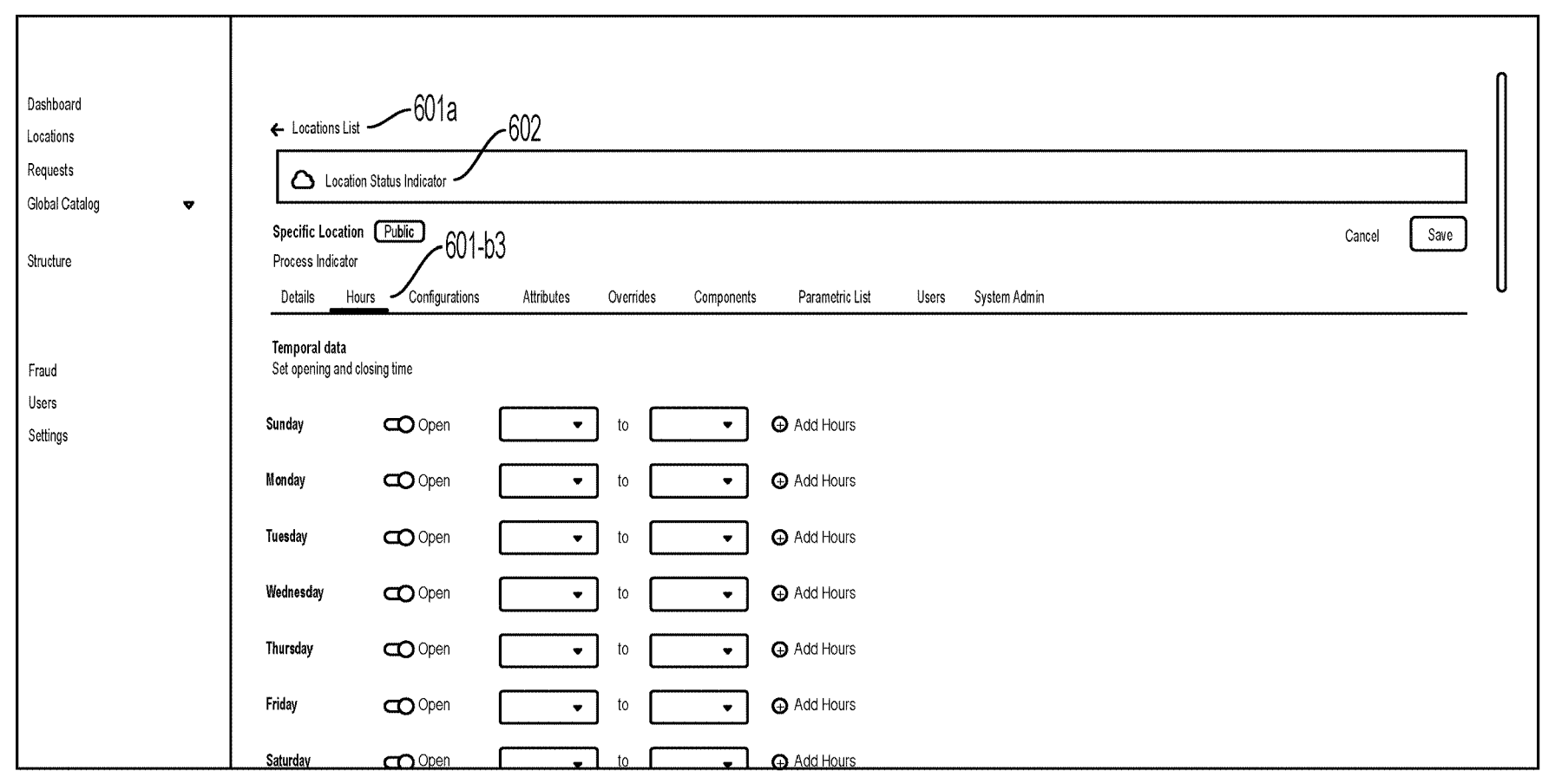
Figure 6E:
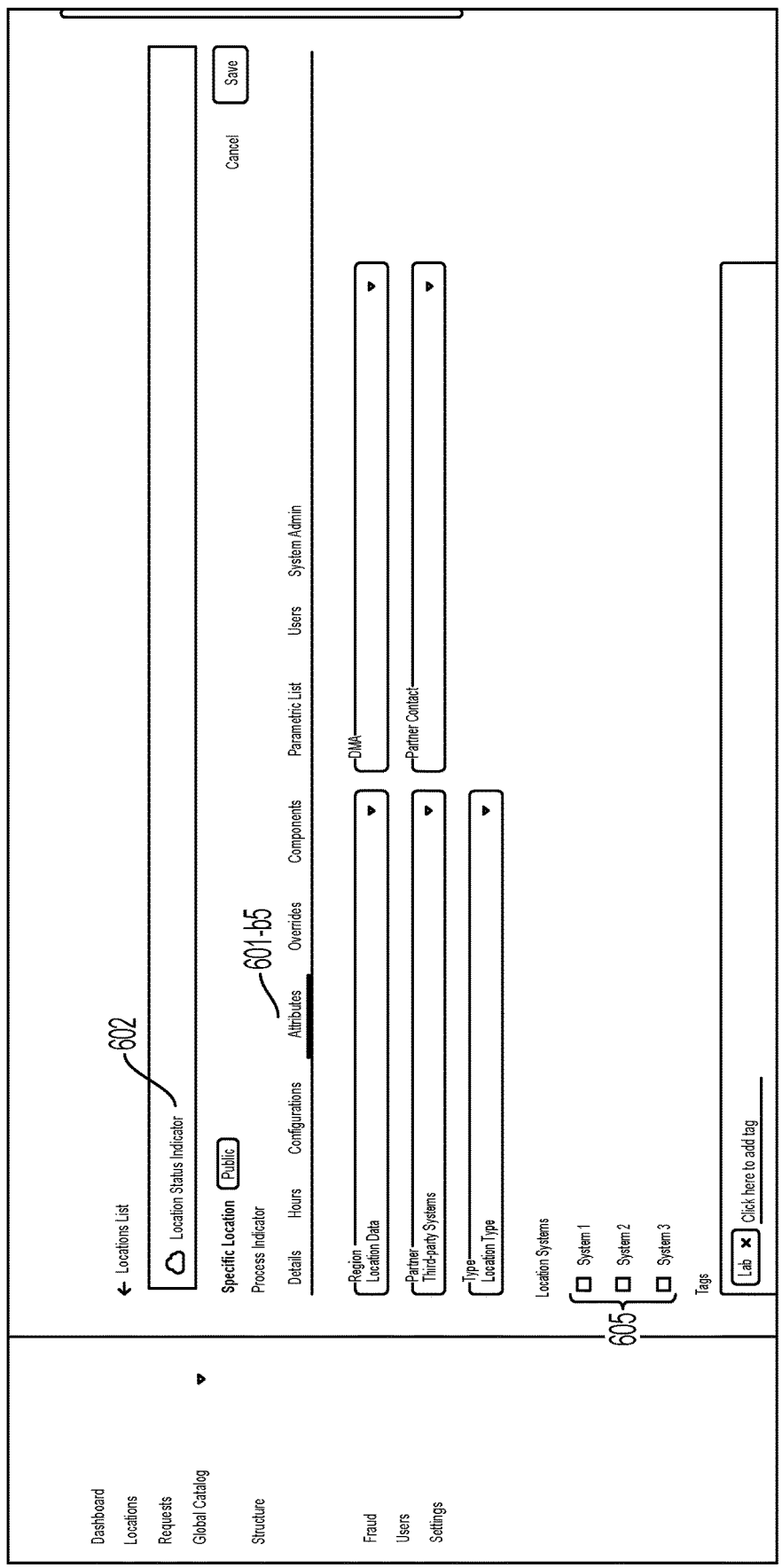
Figure 6F:
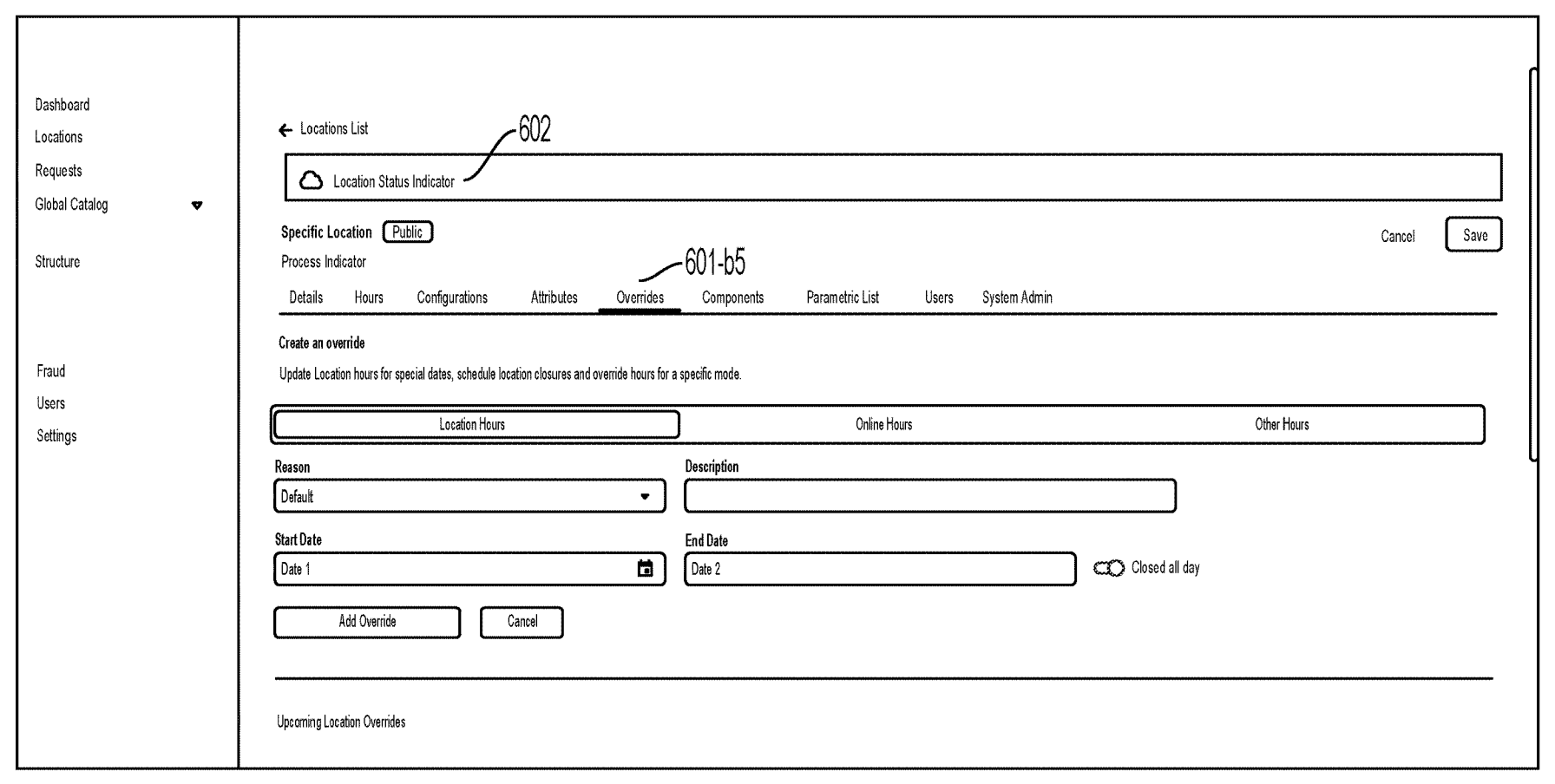
Figure 6G:
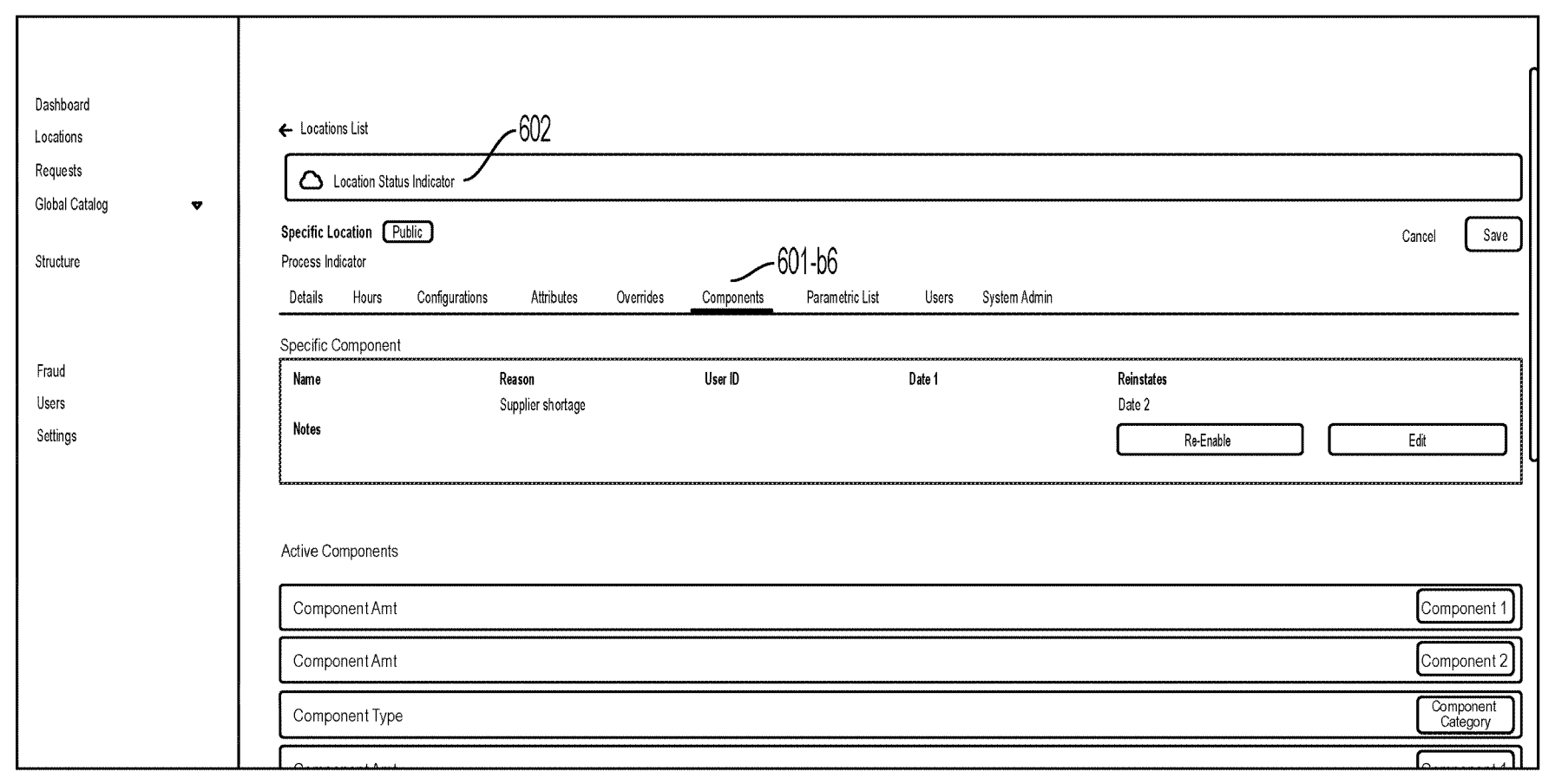
Figure 6H:
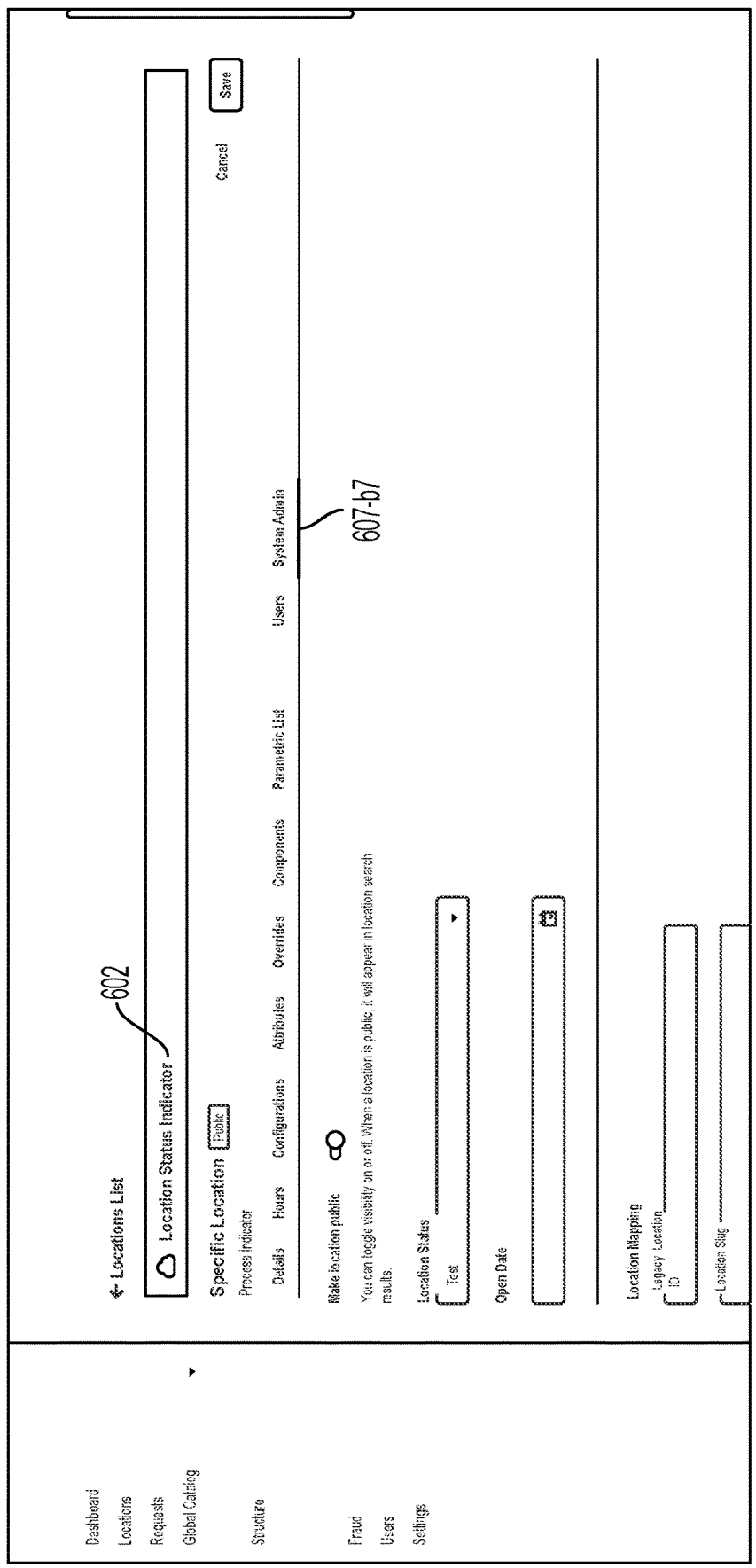
Figure 6J:
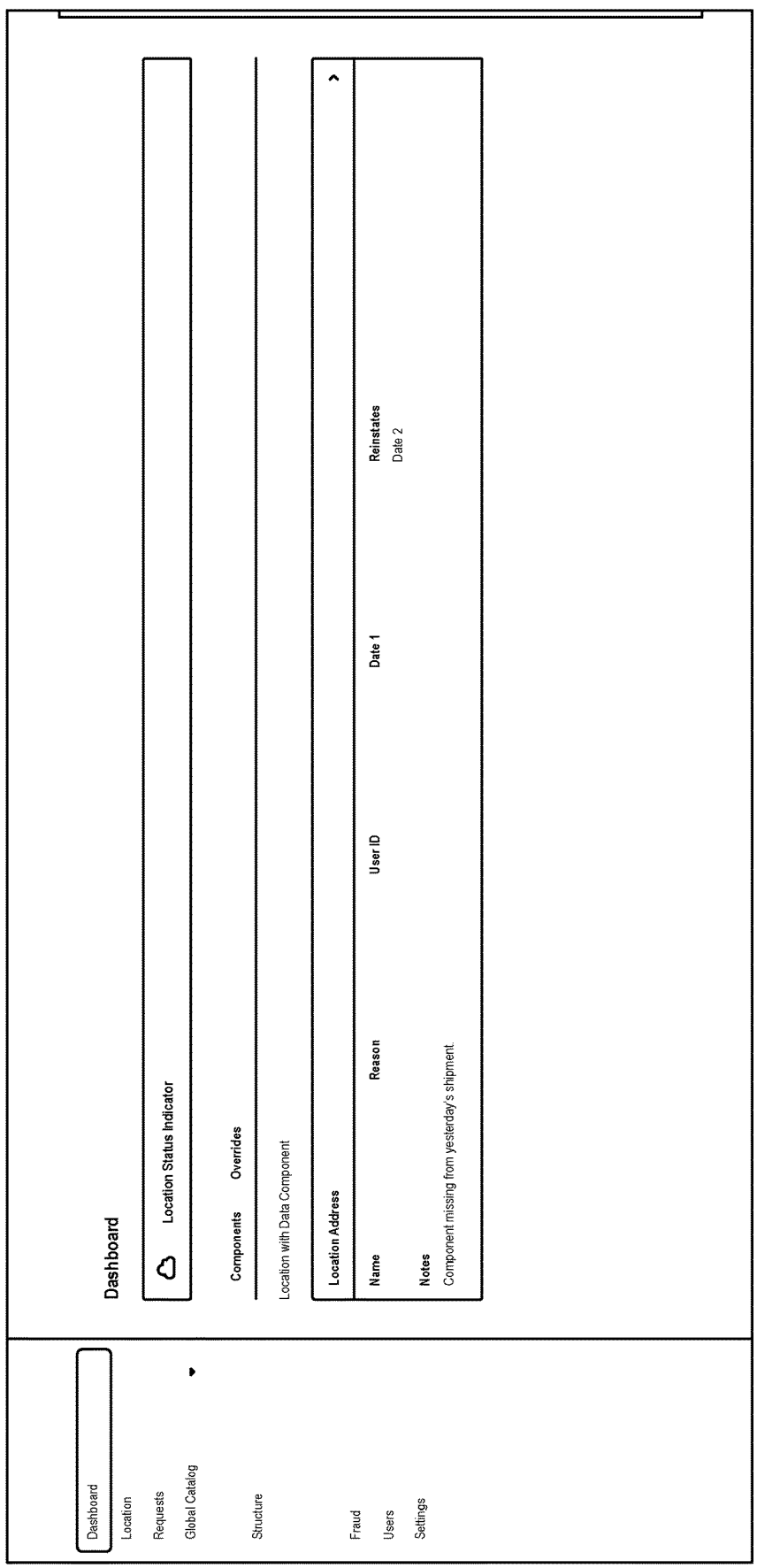
Figure 6L:
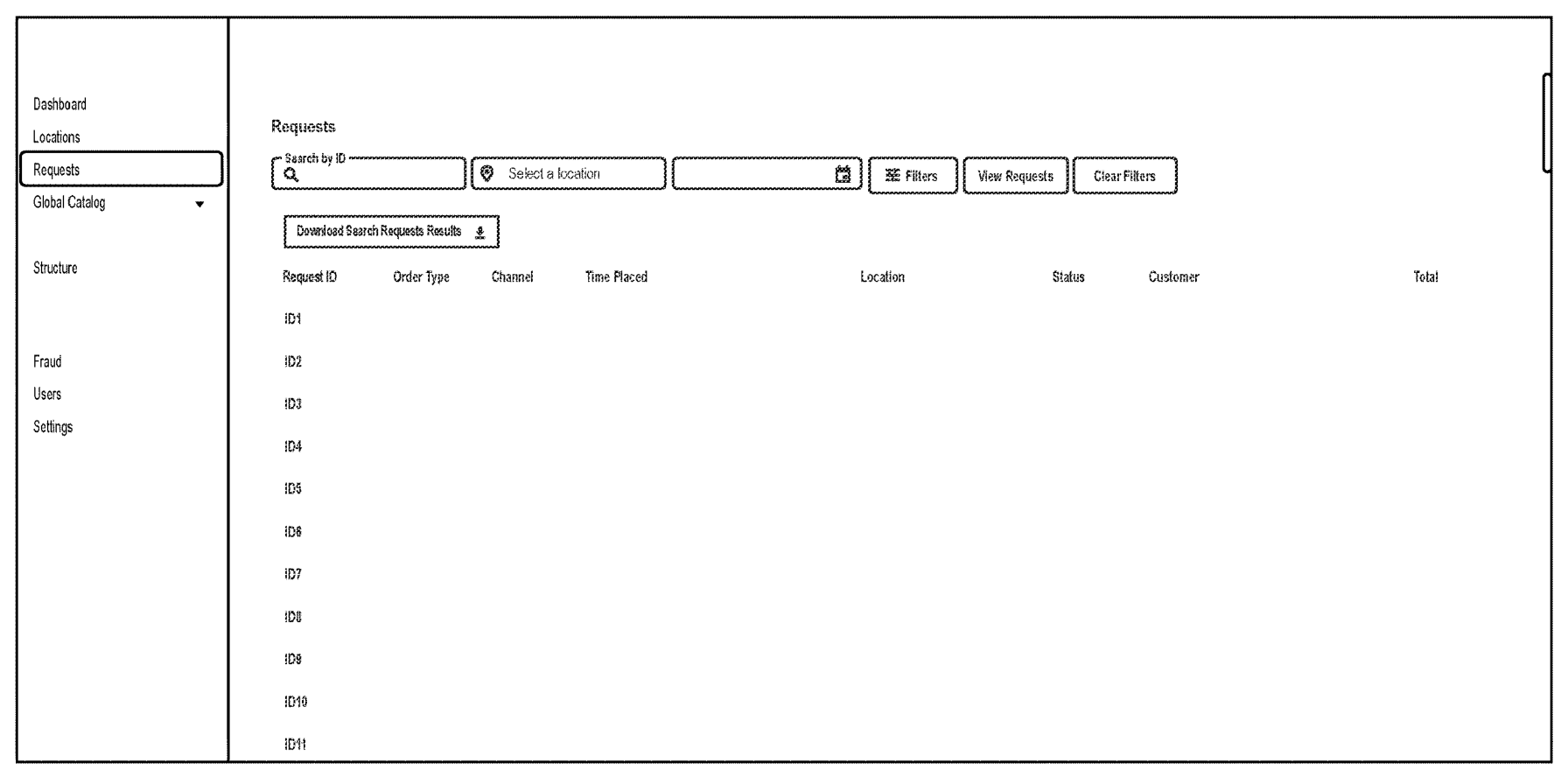
Figure 6M:
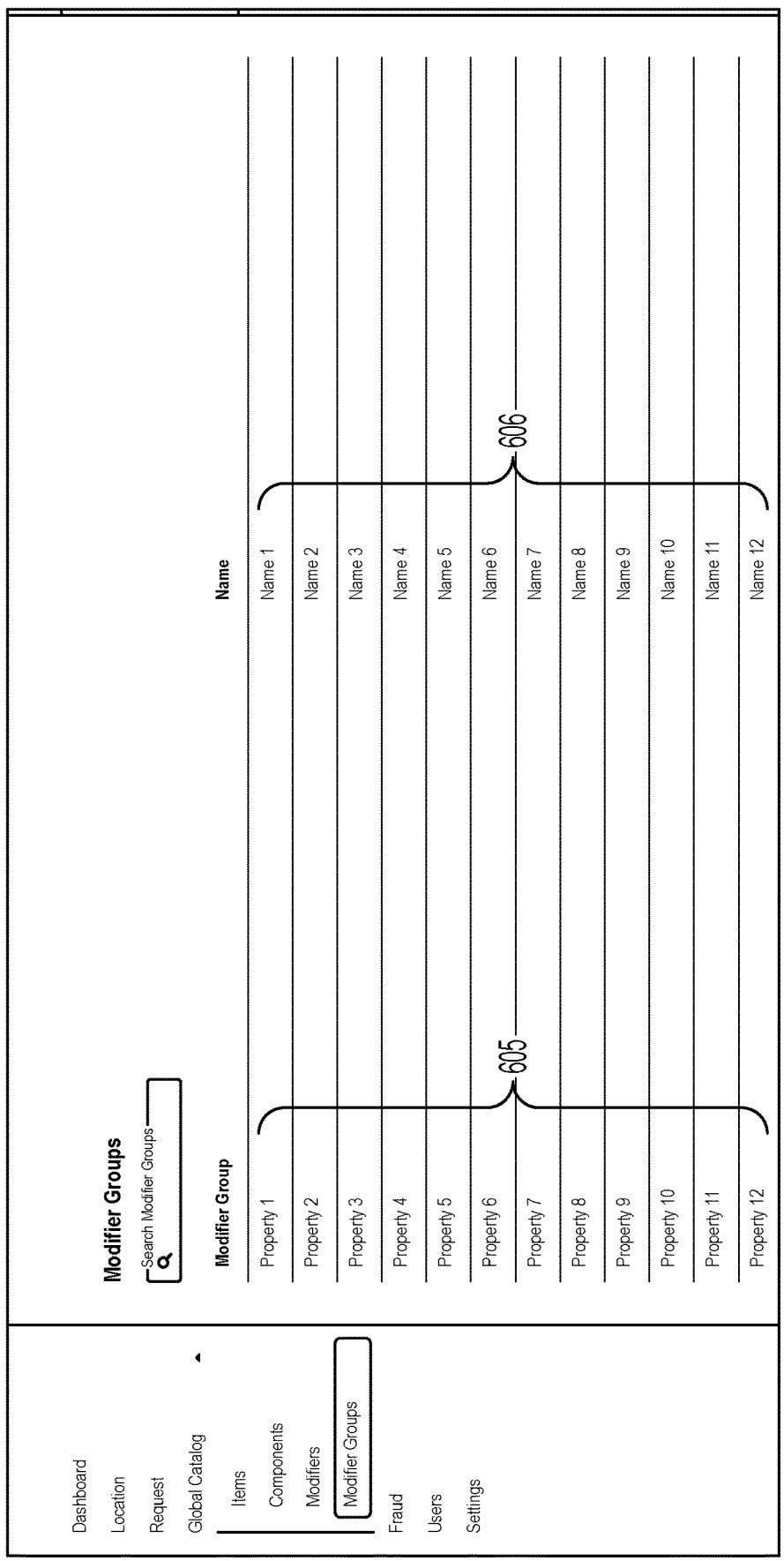
Figure 60:
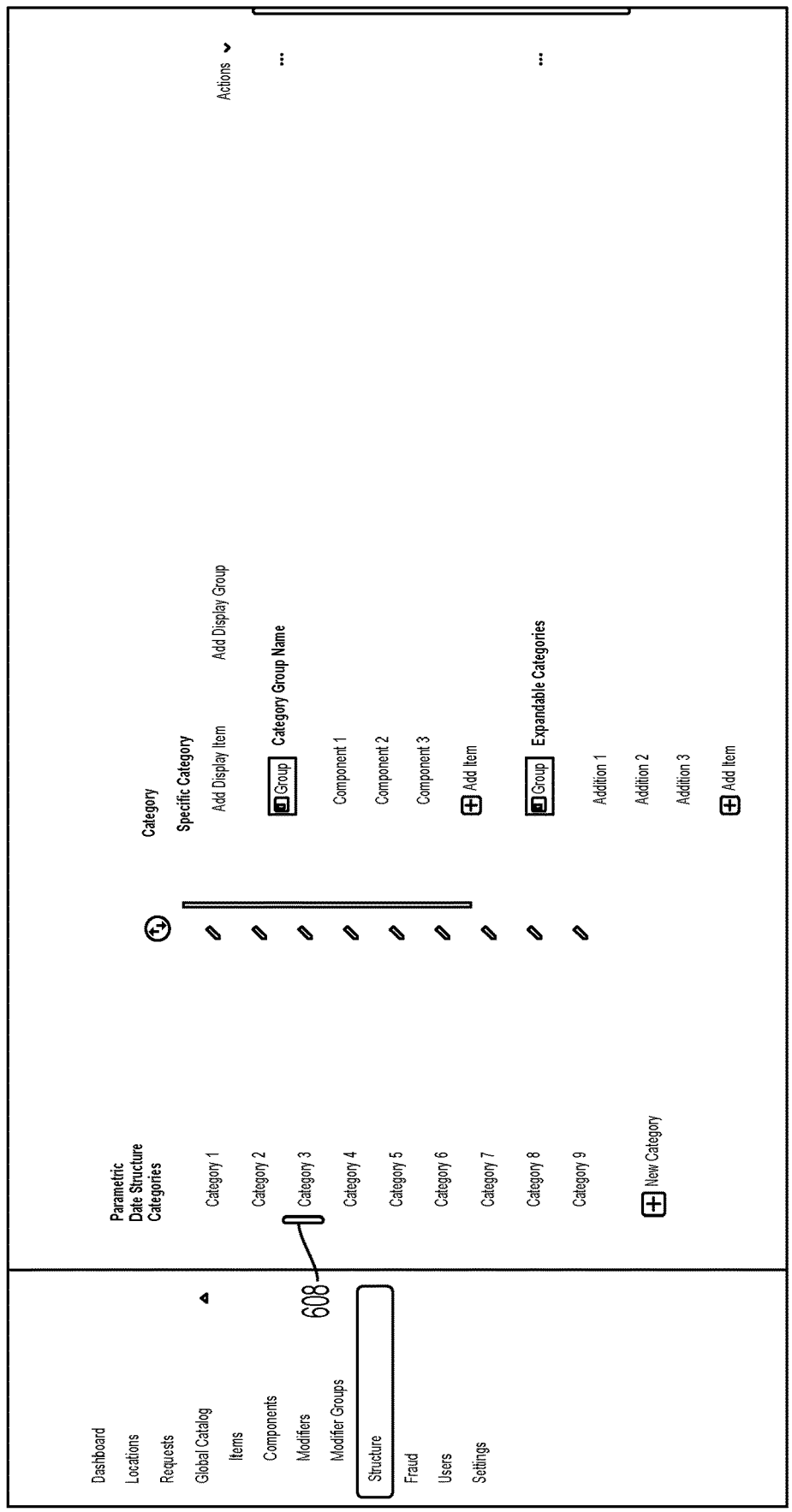
Figure 6P:
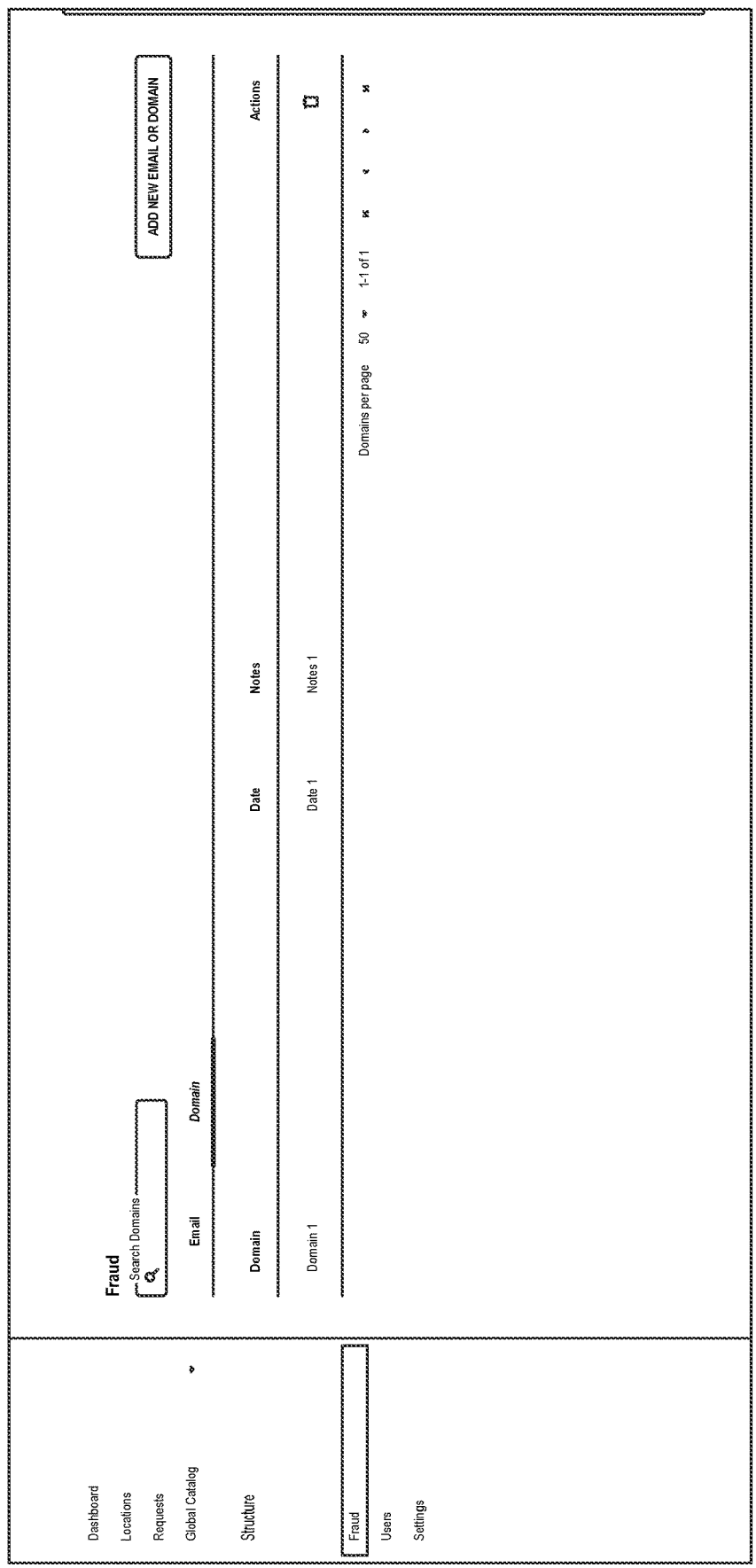
Figure 6R:
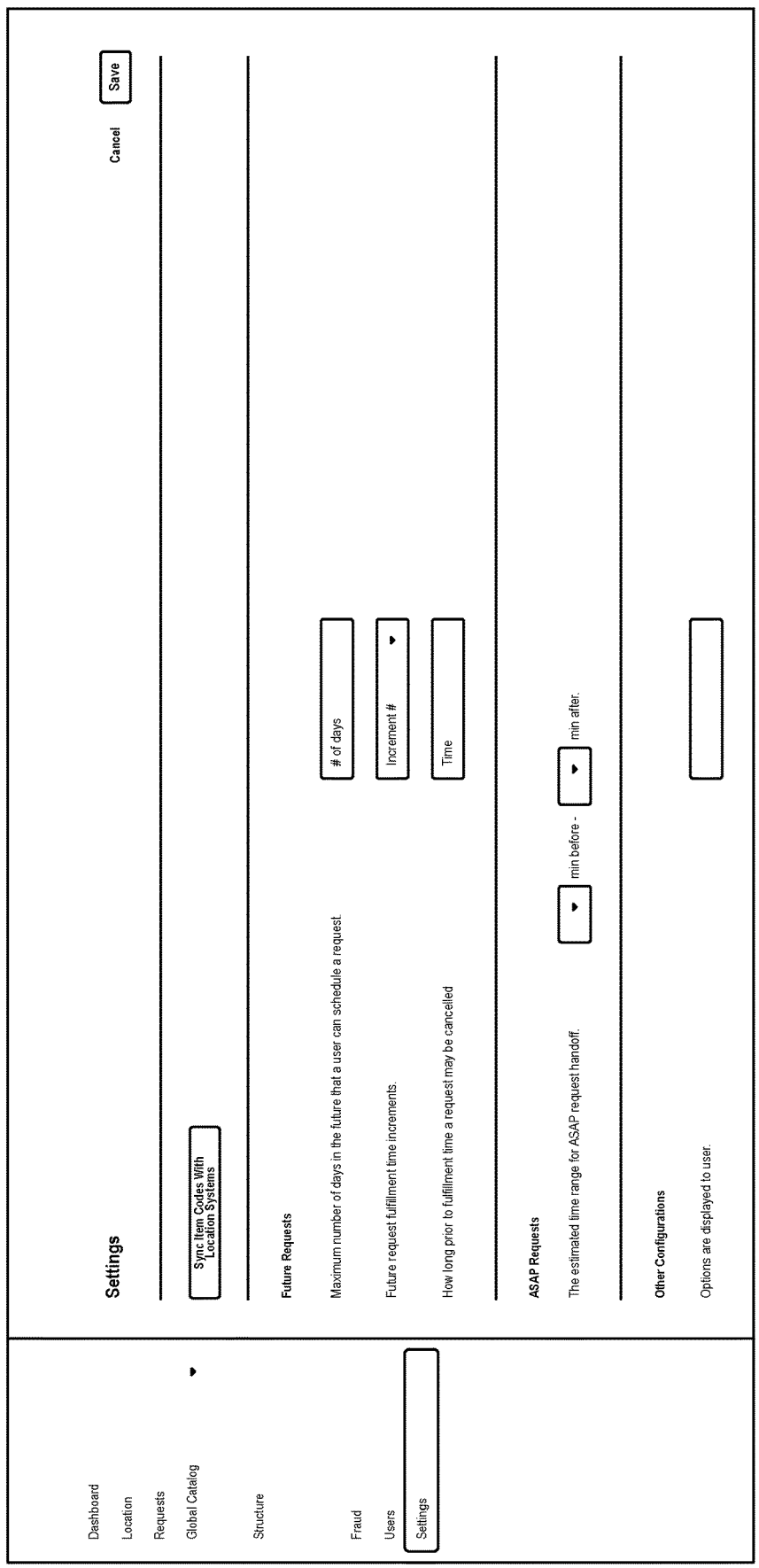

FIG. 6A to 6R show exemplary visualizations associated with a web application that enables a user (e.g., an admin user) to access the platform system 104. FIG. 6A shows a first visualization that includes a plurality of display elements such as a location list 610, a location status indicator 602, a components identifier 603 with attendant component type element 604a and component amount element 604b. In particular, the various display element shown are based on a hovering or selecting a location display element associated with the indicated visualization. According to one embodiment, the selection of a components tab 601-b1 facilitates the generation of the components identifier 603 with attendant component type element 604a and component amount element 604b. It is appreciated that the component identifier 603 with attendant component type element 604a and component amount element 604b are associated with configuring, updating, or parameterizing a parametric data object having a plurality of degrees of freedom. In particular, the degrees of freedom of a given parametric data object determines the configurability and/or an amount or number of parameters of said parametric data object, and/or component types associated with the parametric data object, and/or data values of the parametric data object.

According to one embodiment, hovering or selecting the details display element 601-b2 generates the visualization shown in FIG. 6B. In particular, FIG. 6B indicates identifier data of a specific location associated with the platform system 104.

Similarly, hovering or selecting the temporal tab 601-b3 associated with a specific location or network in communication with the platform system 104 generates a plurality of temporal data indicating specific times of operation or specific durations within which specific parametric data objects are available to fulfil user requests as shown in FIG. 6C.

As can be seen in FIG. 6D, selecting a configurations tab 601-b4 generates a visualization with request toggles 603 that enable activation or deactivation of the serviceability of a specific location associated in the platform system 104. In particular, the request toggles 603 remotely confirm whether a specific network associated with the platform system can receive and/or reject user requests as the case may be. Moreover, the visualization of FIG. 6D can indicate process flow times 604 required for a given location to complete processing a user request.

Turning to FIG. 6E, an attributes tab 601-b5 may be selected to generate a visualization indicating one or more computing or processing systems 605 or third-party systems associated with or leveraged by a given computing network associated with the platform system 104.

FIG. 6F shows a selection of an overrides tab 601-b5 of a given location or computing network associated with the platform system 104. It is appreciated that the overrides tab beneficially enables a user (e.g., an administrator) to override workflows associated with one or more parametric data objects and/or adapt configuration setting associated with parametric data objects or data components associated with parametric data objects for specific timeframes including a first timeframe, a second timeframe, a third timeframe, etc.

FIG. 6G shows an exemplary visualization that is generated when the components tab 601-b6 is selected. In the illustrated embodiment, status data associated with a specific parametric data object and/or data components associated with a parametric data object may be automatically generated and/or customized for a given location or network associated with the platform system 104.

FIG. 6H shows an exemplary visualization generated upon selecting a system admin tab 601-b7 associated with a data network of the platform system 104. Indicated in this figure are a plurality of options that configure the visibility of a selected location to users (e.g., admin and non-admin users).

FIG. 6I shows an exemplary visualization generated in response to selecting a specific data component associated with FIG. 6A. In particular, this figure provides a user (e.g., an admin user) the flexibility of reviewing factors affecting parameterizing a specific parametric data object and/or data components associated with same.

FIGS. 6J-6L show exemplary visualizations associated with selecting specific options of the visualization shown in FIG. 6A and which enable a user to view or otherwise appreciate various aspects of parametric data objects associated with a plurality of networks or locations of the platform system 104.

FIGS. 6M and 6N show exemplary visualizations associated with selecting a modifier group option comprised in FIG. 6A. In particular, the visualizations shown allow customizing and/or modifying and/or adapting a plurality of data properties 650 and/or data values 606, and/or modifier values 607 associated with one or more parametric data objects and/or data components associated with a parametric data object or parametric lists to determine one or more degrees of freedom associated with the parametric data object.

FIG. 6O provides an exemplary visualization indicating a parametric structure for one or more parametric data objects disclosed. In the illustrated implementation, a selected category 608 comprised in a specific parametric data object has associated category identifiers, category components, and expandable options for expanding or contracting the degrees of freedom associated with the parametric data object under consideration.

FIGS. 6P, 6Q, and 6R respectfully show: flagged networks, users, websites, systems, or applications that are either blocked or indicated as fraudulent relative to the platform system 104; user access data indicating specific user interactions with the platform system 104; and additional settings data for configuring one or more subs-systems of the platform system 104, respectively.

Exemplary Flowchart

Figure 7A:
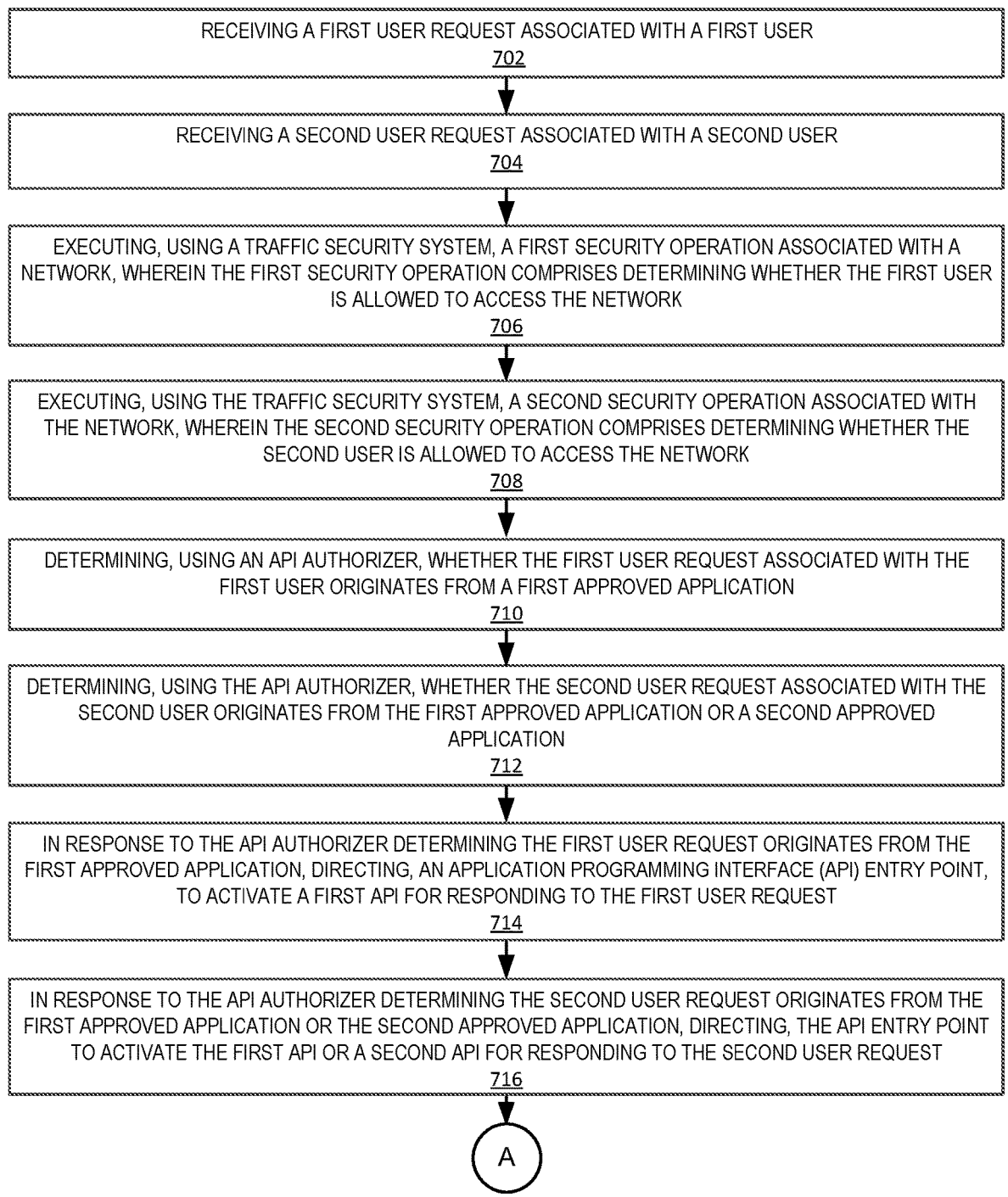
FIGS. 7A and 7B show exemplary first flowcharts for methods, systems/apparatuses, and computer program products associated with handling or managing user requests within a complex computing network.
Figure 7B:
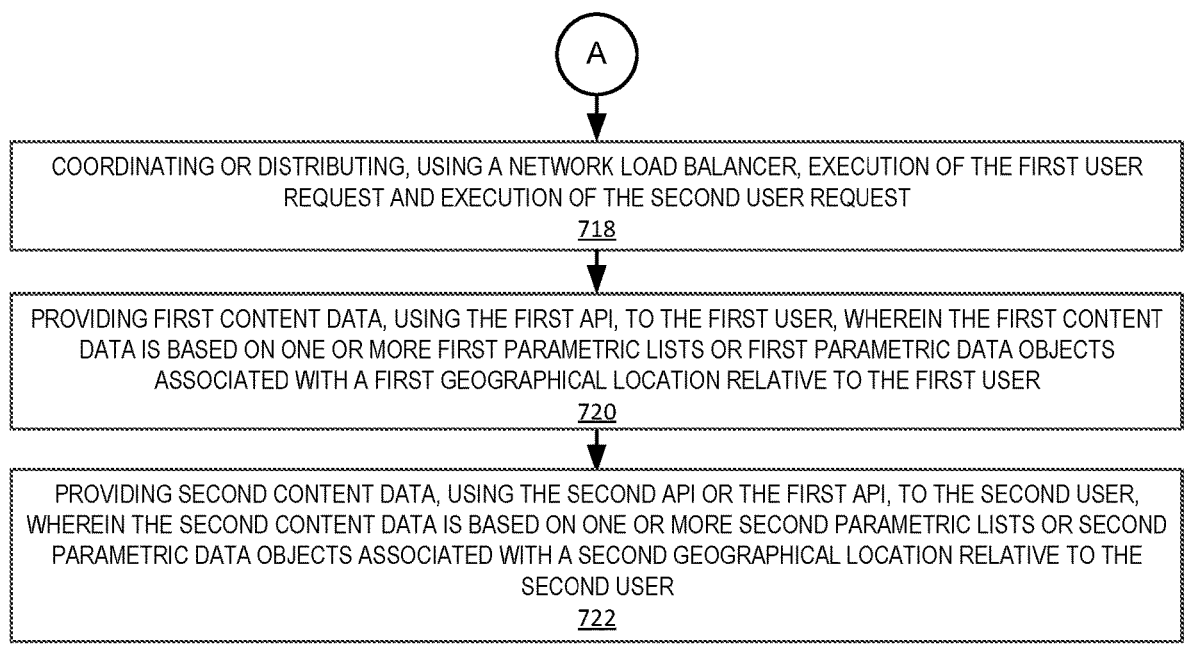

FIGS. 7A and 7B show exemplary first flowcharts for methods, systems/apparatuses, and computer program products associated with handling or managing user requests within a complex computing network. It is appreciated that one or more data engines stored in a memory device may cause a computer processor to execute the various processing stages of FIGS. 7A and 7B.

At block 702, one or more data engines may be used to receive a first user request associated with a first user. The one or more data engines may also be used to receive a second user request associated with a second user as indicated at block 704. Moreover, the one or more data engines may also facilitate executing, using a traffic security system (e.g., a data traffic security system), a first security operation associated with a network such that the first security operation comprises determining whether the first user is allowed to access the network at block 706. The one or more data engines may further facilitate executing, using the traffic security system, a second security operation associated with the network such that the second security operation comprises determining whether the second user is allowed to access the network as indicated at block 708.

The one or more data engines may drive: determining, using an API authorizer, whether the first user request associated with the first user originates from a first approved application at block 710; and determining, using the API authorizer, whether the second user request associated with the second user originates from the first approved application or a second approved application at block 712.

In response to the API authorizer determining the first user request originates from the first approved application, the one or more data engines may direct, an API entry point at block 714, to activate a first API for responding to the first user request. Similarly, in response to the API authorizer determining the second user request originates from the first approved application or the second approved application, the one or more data engines may direct, the API entry point to activate the first API or a second API for responding to the second user request at block 716.

Turning to block 718, the one or more data engines may facilitate coordinating or distributing, using a network load balancer, execution of the first user request and execution of the second user request. In addition, the one or more data engines may further enable, at block 720, providing first content data, using the first API, to the first user such that the first content data is based on one or more first parametric lists or first parametric data objects associated with a first geographical location relative to the first user. In addition, the one or more data engines may also provide second content data, at block 722, using the second API or the first API, to the second user such that the second content data is based on one or more second parametric lists or second parametric data objects associated with a second geographical location relative to the second user as indicated.

These and other implementations may each optionally include one or more of the following features. The traffic security system, according to one embodiment, interacts with a network interface for enabling the first user associated with the first user request received from a first computing device to connect to the network.

Furthermore, the first security operation may be executed based on applying one or more access instructions or rules.

In some embodiments, the method described above comprises providing, using a security repository system, access to a third user connecting to the network.

In addition, the above method can also comprise providing access, using a security repository system and using the API entry point, to an analytics system.

According to some embodiments, the API entry point comprises at least two API entry points.

In addition, the first user comprises an administrative or non-administrative user.

Moreover, the above method can comprise enabling the first user or the second user selective access to one or more parametric lists and one or more parametric data objects.

The above method can also comprise dynamically modifying one or more parametric objects or parametric data objects based on availability of one or more physical items associated with a geographical location.

In some implementations, the above method comprises determining that the first geographical location is associated with the first user and determining that the second geographical location is associated with the second user.

It is appreciated that the first user request may be received from a first mobile or non-mobile computing device.

In addition, the above method can comprise providing the first user request or the second user request to an analytics system comprising one or more dynamic container services.

In some cases, the above method comprises providing a message broker system for coordinating progression of the first user request or the second user request.

In some instances the above method comprises providing a structured database system to enable determining that a computing operation being executed in the network is within an operational threshold or limit.

It is appreciated that the above method can also include providing a dynamic cache system for reading data from or writing data to a database system or a content storage system.

It is further appreciated that the above method can include providing a messaging system for facilitating electronic communication among one or more systems or devices connected to the network.

Figure 8A:
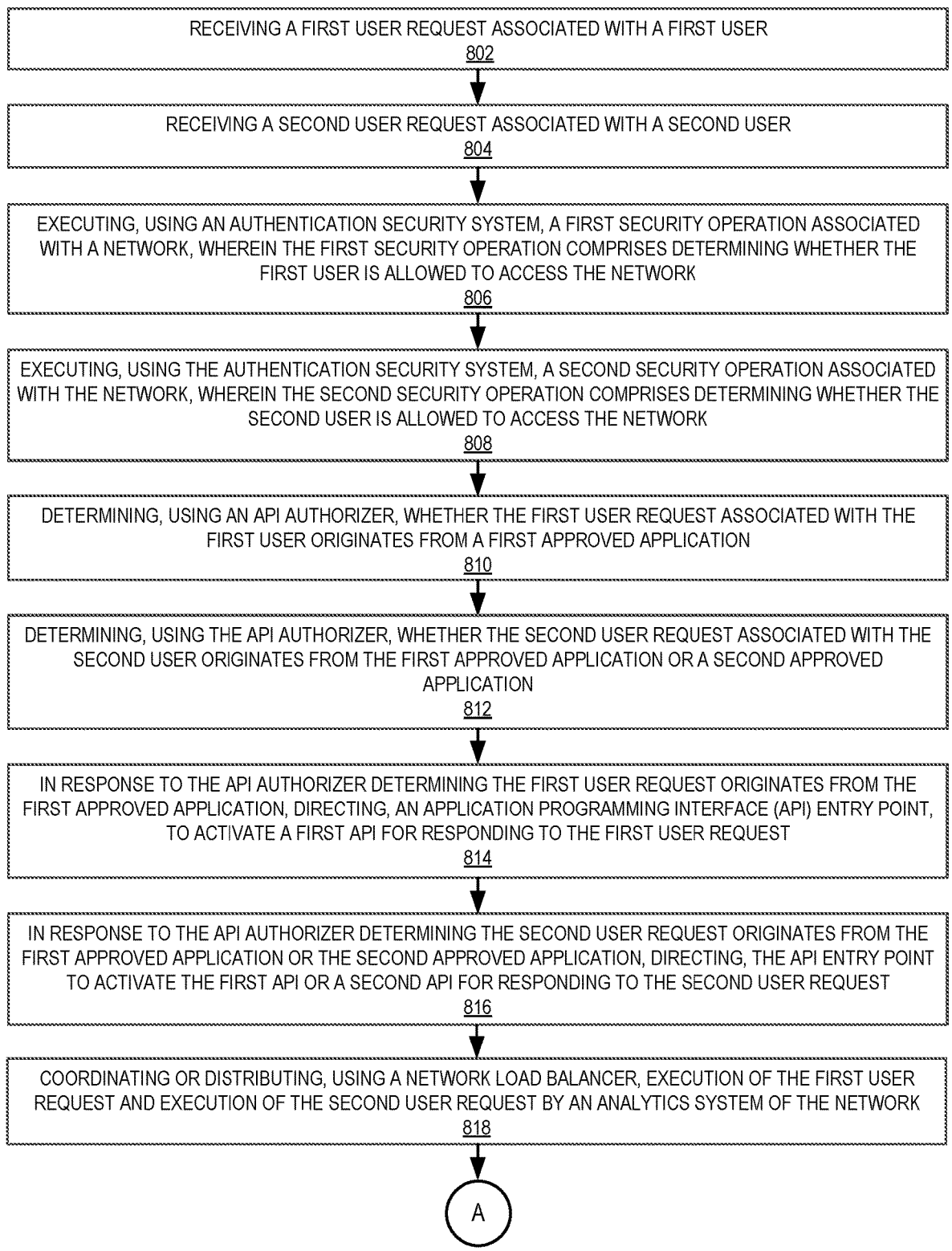
FIGS. 8A and 8B show exemplary second flowcharts for methods, systems/apparatuses, and computer program products associated with handling or managing user requests within a complex computing network.
Figure 8B:
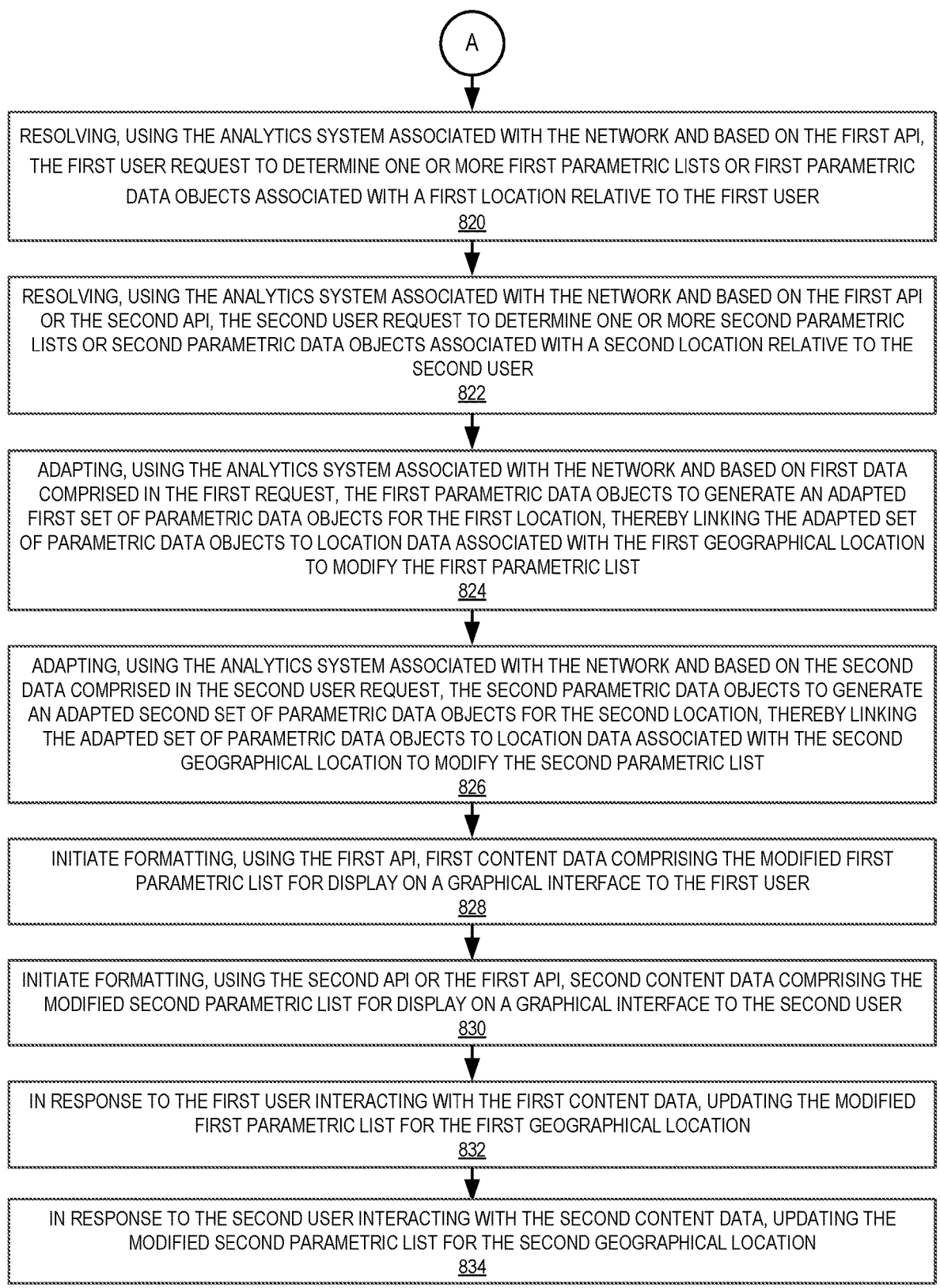

FIGS. 8A and 8B show exemplary second flowcharts for methods, systems/apparatuses, and computer program products associated with handling or managing user requests within a complex computing network. It is appreciated that one or more data engines stored in a memory device may cause a computer processor to execute the various processing stages of FIGS. 7A and 7B. For example, the one or more data engines may be associated with a platform system such as those discussed herein and may be included or associated with one or more web or non-web applications.

At block 802, one or more data engines may receive a first user request associated with a first user. The one or more data engines may also receive, at block 804, a second user request associated with a second user. In addition, the one or more data engines may facilitate executing, using an authentication security system, a first security operation associated with a network at block 806 such that the first security operation comprises determining whether the first user is allowed to access the network. The one or more data engines may also facilitate executing, using the authentication security system, a second security operation associated with the network at block 808 such that the second security operation comprises determining whether the second user is allowed to access the network.

At block 810, the one or more data engines may enable determining, using an API authorizer, whether the first user request associated with the first user originates from a first approved application. Furthermore, the one or more data engines may facilitate determining, using the API authorizer, whether the second user request associated with the second user originates from the first approved application or a second approved application as indicated at block 812. In response to the API authorizer determining the first user request originates from the first approved application, the one or more data engines may direct, at block 814, an API entry point, to activate a first API for responding to the first user request. Furthermore, in response to the API authorizer determining the second user request originates from the first approved application or the second approved application, the one or more data engines may direct at block 816, the API entry point to activate the first API or a second API for responding to the second user request.

According to some embodiments, the one or more data engines may facilitate, at block 818, coordinating or distributing, using a network load balancer, execution of the first user request and execution of the second user request by an analytics system associated with the network. In particular, the one or more data engines may enable resolving, using the analytics system of the network and based on the first API at block 820, the first user request to determine one or more first parametric lists or first parametric data objects associated with a first location relative to the first user. In addition, the one or more data engines may enable resolving, using an analytics system associated with the network and based on the first API or the second API at block 822, the second user request to determine one or more second parametric lists or second parametric data objects associated with a second location relative to the second user.

In some implementations, the one or more data engines may drive adapting, using the analytics system associated with the network and based on first data comprised in the first request, the first parametric data objects to generate an adapted first set of parametric data objects for the first location, thereby linking the adapted set of parametric data objects to location data associated with the first geographical location to modify a first parametric list such that the first parametric list comprises the adapted first set of parametric data objects as indicated at block 824. Similarly, the one or more data engines may drive adapting, using the analytics system associated with the network and based on the second data comprised in the second user request, the second parametric data objects to generate an adapted second set of parametric data objects for the second location, thereby linking the adapted set of parametric data objects to location data associated with the second geographical location to modify a second parametric list such that the second parametric list comprises the adapted second set of parametric data objects as indicated at block 826. It is appreciated that the first data or the second data may comprise component data that is configured to trigger adapting parametric data objects and thereby adapt parametric lists associated with the adapted parametric data objects. According to one embodiment, the component data is extracted or derived from the first user request and/or the second user request and is evaluated based on threshold data associated with one or more parametric data objects prior to updating the parametric data object(s) and/or parametric lists associated with same.

Turning back to FIG. 8B, the one or more data engines may initiate formatting, using the first API at block 828, first content data comprising the modified first parametric list for display on a first graphical interface to the first user or a third user associated with the first location. In addition, the one or more data engines may initiate formatting, using the second API or the first API at block 830, second content data comprising the modified second parametric list for display on a second graphical interface to the second user or a fourth user associated with the second location. According to one embodiment, the first content data and/or the second content data may be comprised in a multi-dimensional visualization that is presented to the first user and the second user via a graphical interface. In addition, the multi-dimensional visualization may have one or more indicators that may be activatable by the first user or the second user to further enhance and/or clarify and/or augment and/or program and/or further calibrate or further configure and/or finalize or terminate the first user request or the second user request to enable the analytics systems to analyze and/or complete the first user request or the second user request.

In response to the first user interacting with the first content data, the one or more data engines may update at block 832, the modified first parametric list for the first geographical location. Moreover, in response to the second user interacting with the second content data, the one or more data engines may update at block 834, the modified second parametric list for the second geographical location.

These and other implementations may each optionally include one or more of the following features.

The traffic security system, according to one embodiment, interacts with a network interface for enabling the first user associated with the first user request received from a first computing device to connect to the network.

In other embodiments, the first parametric list comprises one or more of: component combination data associated with the one or more first parametric lists or first parametric data objects; and parametric data object combination data associated with one or more of the first parametric lists or the first parametric data objects.

Furthermore, the component combination data can comprise a combination of one or more components associated with the first parametric data objects while the parametric data object combination data comprises a combination of one or more parametric data objects including the first parametric data objects.

According to some embodiments, the one or more data engines may provide access, using a security repository system and using the API entry point, to the analytics system.

In some cases, in response to the first user interacting with the first content data or the second user interacting with the second content data, the one or more data engines may update a third parametric list associated with a third geographical location or a fourth geographical location to generate a modified third parametric list. It is appreciated that the one or more data engines may further provide, on a graphical display device, the modified third parametric list to one or more of: the first user; the second user; a third user associated with the third geographical location; or a fourth user associated with a fourth geographical location. In some implementations, the modified third parametric list may be generated by the one or more data engines based on arriving at or exceeding a component threshold data value associated with at least one of the first geographical location, the second geographical location, the third geographical location, or the fourth geographical location.

In some embodiments, the first user comprises an administrative or non-administrative user.

In addition, the one or more data engines may enable the first user, or a third user, selective access to the modified first parametric list for the first geographical location.

According to some embodiments, the one or more data engines may dynamically generate the modified first parametric list by adjusting the adapted first parametric data objects or third parametric data objects associated with the first geographical location based on availability data variably indicating data changes to component information associated with the first geographical location.

Moreover, the one or more data engines may determine that the first geographical location is associated with the first user as well as determine that the second geographical location is associated with the second user.

It is appreciated that the first user request may be received from a mobile or non-mobile computing device. It is further appreciated that the analytics system can comprise one or more dynamic container services.

In some cases, the one or more data engines may provide a message broker system for coordinating progression of the first user request or the second user request to the analytics system. In addition, the one or more data engines may provide a structured database system to enable determining that a computing operation being executed in the network is within an operational threshold or limit. In some cases, the one or more data engines may provide a dynamic cache system for reading data from or writing data to a database system or a content storage system. It is appreciated that the one or more data engines may also provide a messaging system to facilitate electronic communication among one or more systems or devices connected to the network.

It is appreciated that the parametric lists disclosed herein can comprise a plurality of parametric data objects. According to one embodiment, each parametric data object comprised in the plurality of parametric data objects has one or more degrees of freedom that define or otherwise indicate or characterize the data element/component expandability or contractability of each parametric data object. In some embodiments, the degrees of freedom associated with a group of parametric data objects comprised in the plurality of parametric data objects indicate or otherwise characterize data element/component expandability or contractability associated with the group of parametric data objects. In some cases, the degrees of freedom associated with each parametric data object or a group of parametric data objects comprise a quantitative or qualitative number of dependent or independent data values that can be used to dynamically configure, update, or otherwise control one or more of a parametric list, a parametric data object, or a group of parametric data objects or data requests associated with the parametric list, or the parametric data object, or the group of parametric data objects as the case may require. In one embodiment, the parametric list comprises data indicating a menu or a list of nutritional items.

According to some embodiments, a user request associated with a parametric list or a parametric data object comprises: a nutritional request; an equipment request; a service request; a delivery request; a research request; a pharmaceutical request; an agricultural request; a chemical request; a containerized object request; a code request; an object-oriented programming logic request; etc. In some cases, the parametric list or the parametric data object comprises a file or a document or a digital data object associated with one or more of: a computing network configured to manage or regulate nutritional data; a computing network configured to manage or regulate equipment data; a computing network configured to manage or regulate computing service data; a computing network configured to manage or regulate research data; a computing network configured to manage or regulate pharmaceutical data; a computing network configured to manage or regulate agricultural data; a computing network configured to manage or regulate chemical data; a computing network configured to manage or regulate containerized object data; a computing network configured to manage or regulate computing code data; a computing network configured to manage or regulate object-oriented programming logic data.

ADDITIONAL ASPECTS

The disclosed solution beneficially includes one or more of the following additional features:
  Calibrating Parametric Data Objects and/or Parametric Lists
  Preemptively Updating Component Amount Data
  Detecting One or More Computing Devices within Network Environment
  Adaptively Routing or Rerouting User Requests
  Leveraging Profile Data, Temporal Data, and/or User Request Data
  Combining User Request Data With Third-Party System Data These aspects are further discussed below.

Calibrating Parametric Data Objects and/or Parametric Lists

According to one embodiment, the disclosed solution comprises automatically calibrating and/or updating one or more parametric data objects and/or customizing parametric lists based on physical data of components associated with the one or more parametric data objects or parametric lists. For example, one or more computing networks associated with the network environment 100 may include sensors (e.g., video sensors, radar sensors, volumetric sensors, etc.) that computationally track or otherwise monitor physical data associated with one or more components of one or more parametric data objects. In one embodiment, the sensors detect the presence or absence of one or more components associated with the one or more parametric data objects. In other embodiments, the sensors detect the presence or absence of a quantity of the one or more parametric data objects. Furthermore, the sensors may include chemical sensors that detect and transmit chemical concentration data and/or particle activity data associated with the one or more components of parametric data objects. In some cases, the sensors include flow sensors that can measure flow rate data associated components of one or more parametric data objects and thereby determine a quantitative and/or qualitative amount to ascribe to the one or more parametric data objects. In some cases, the sensors include humidity sensors that can measure moisture data and/or temperature data of an environment surrounding components of the one or more parametric data objects and which beneficially inform whether the components of one or more parametric data objects have utility.

Based on the physical data, a given parametric data object and/or parametric list associated with one or more parametric data objects may be adaptively changed or otherwise customized to reflect changes to the physical data associated with the one or more components of said given parametric data object. It is appreciated that the physical data may be generated and/or updated using a computing device associated with the platform system 104, according to some embodiments. In such cases, updates or changes to the physical data may automatically drive calibrations or data updates to the one or more parametric data objects and/or parametric lists. It is appreciated that the physical data and/or updates to the one or more parametric data objects or parametric lists may be stored in a database associated with the network environment 100.

According to one embodiment, the network environment 100 includes a plurality of networks such that physical data may be generated and/or updated for each of the plurality of networks and thereby customize one or more parametric data objects and/or parametric lists associated with each of the plurality of networks. It is appreciated that the physical data and/or updates to the one or more parametric data objects and/or parametric lists may be stored in: a database corresponding to each of the plurality of networks; or stored in a database local to each of the plurality of networks; or stored in a database remotely located relative to the plurality of networks. In some cases, a first network comprised in the plurality of networks is disparately located from a second network comprised in the plurality of networks such that the first network and the second network are geographically isolated from each other or are geographically connected to each other. Furthermore, once a user submits a request that is routed or rerouted to a particular network comprised in the plurality of networks of the network environment 100, the user may be presented with stored updated parametric data objects or parametric lists associated with the network to which the user has been routed or rerouted.

Preemptively Updating Component Amount Data

In some embodiments, the disclosed solution beneficially facilitates preemptively updating component amount data based on quantitative and/or qualitative data captured within the network environment 100. For example, one or more computing systems and/or sensors may be used to capture physical data of one or more components as discussed above such that the physical data comprises quantitative and/or qualitative data captured in association with one or more components.

In exemplary implementations, the quantitative data comprises one or more data values indicating a magnitude, a volume, a mass, a number, or an amount associated with the one or more components of one or more parametric data objects or parametric lists. Furthermore, the qualitative data can comprise at least visual indicator data (e.g., color codes, textual comparative data, etc.) and/or chemical composition data (e.g., data indicating usability or non-suability) of the one or more components.

According to one embodiment, the quantitative data is used independently of the qualitative data to characterize availability of the one or more components associated with one or more parametric data objects and/or parametric lists. In other embodiments the quantitative data is combined with the qualitative data to inform characterizing the one or more parametric data objects or parametric lists. It is appreciated that the quantitative data and/or qualitative data may be used to ensure that one or more components associated with the parametric data object and/or parametric lists do not exceed or fall below a specific threshold data value.

According to one embodiment, one or more artificial intelligence (AI) or machine learning (ML) models such as those discussed in association with FIG. 4E may be used within the network environment 100 to predictively estimate and/or forecast the quantitative and/or qualitative data associated with the one or more components. In such cases, the one or more AI or ML models may be trained using, for example: user request data comprised in the plurality of requests received by the platform system 104; quantitative and/or qualitative data correlated with temporal data associated with a plurality of requests received by the platform system 104; usage data of the one or more components associated with the one or more parametric data objects or parametric lists; usage data doubly correlated with, or mapped to temporal data together with the plurality of user request data; or dynamic logic data comprising computing logic used to configure the one or more AI or ML models via, for example, a first admin system (e.g., $1^{st}$ admin system 102b) or a second admin system (e.g., $2^{nd}$ admin access system 102c) as discussed in association with FIGS. 1A and 1B. After training, the one or more AI or ML models can effectively predict or provide forecast or predictions data that characterize and/or preemptively update the one or more components of parametric data objects and/or parametric lists. According to some embodiments, the forecast data or predictions data may be used to validate and/or confirm physical data captured by the sensors and thereby ensure accuracy and/or optimality of the updates to the one or more components of the one or more parametric data objects and/or parametric lists.

It is appreciated that a given parametric list may comprise at least one parametric data object which, in turn, may comprise one or more components. In particular, the parametric list may be defined by, or comprise at least a data structure such that: a first data level (e.g. first data or first controlling data) of the data structure comprises a component combination level where one or more components may be combined to generate a specific parametric data object; a second data level (e.g., second data or second controlling data) of the data structure comprises a parametric data object combination level where one or more parametric data objects may be combined to generate the parametric list. Thus, looking at the parametric list from a granular perspective, it is appreciated that the captured physical data discussed above and/or the forecast or predictions data discussed in association with the one or more AI or ML models effectively define, characterize, or control updating and/or customizing the one or more parametric data objects and/or the parametric lists provided in this disclosure. It is appreciated that the captured physical data and/or forecast or predictions data may also be used to pre-emptively ensure that component magnitudes or data values associated with parametric data objects and/or parametric lists of the network environment 100 do not fall below established thresholds for specific networks or locations associated with the network environment 100. In some cases, the captured physical data and/or forecast or predictions data may be automatically transmitted to stakeholder computing systems which ensure that the component magnitude or value data do not fall below the established thresholds.

Detecting One or More Computing Devices within Network Environment

In some embodiments, the disclosed technology beneficially enables automatically detecting and/or correlating and/or mapping one or more computing devices (e.g., mobile computing device or non-mobile computing device) with user requests. Based on the detection and/or correlating and/or mapping, a visual indicator (e.g., textual or image data) and/or a digital marker object may be generated on a graphical display of a computing device that is distinct from, for example, a first computing device comprised in the one or more computing devices such that the visual indicator or the digital marker object indicates (e.g., surgically points to)

a specific or non-specific location within a specific network comprised in the plurality of computing networks of the network environment 100. For example, the visual indicator or the digital marker object may be embedded or superimposed on a map or a multi-dimensional network layout image of the specific network to show or estimate the specific location within the specific or non-specific network where the first computing device is located.

According to one embodiment, the visual indicator and/or digital marker object are automatically generated once a particular computing device enters a first network of the plurality of networks associated with the network environment 100. For example, a user may send a first request to the platform system 104 using a first computing device or a second computing device or a third computing device. In such cases, the user may send the first request using, for example, an application on the first computing device or the second computing device or the third computing device. Once the first computing device or the second computing device or the third computing device enters the first network, the application on the first computing device or the second computing device or the third computing device communicates with an application (e.g., location detection application) of the platform system 104 to establish the location of the first computing device or the second computing device or the third computing device and thereby generate the visual indicator and/or the digital marker object.

In some embodiments, the first network does not automatically detect the first computing device or the second computing device or the third computing device. Rather, a location display element is automatically generated on a graphical display of the first computing device or the second computing device or the third computing device such that once the location display element is activated on the first computing device or the second computing device or the third computing device, the visual indicator and/or the digital marker object are automatically generated on a fourth computing device that is different from the first computing device or the second computing device or the third computing device. The fourth computing device, for example, may comprise an admin user computing device associated with the first location while the first computing device or the second computing device or the third computing device may comprise a non-admin user computing device.

In some cases, the first computing device or the second computing device or the third computing device is associated with a first user and are digitally linked to specific user requests from the first user (e.g., non-admin users) prior to the generation of the visual indicator and/or the digital marker object. Furthermore, the linked user request may be further digitally mapped to one or more parametric data objects comprised in the specific user requests prior to the generation of the visual indicator and/or the digital marker object. In addition, temporal data may be generated on the first computing device or the second computing device or the third computing device to indicate a duration associated with the completion of one or more user requests sent using the first computing device or the second computing device or the third computing device by the first user.

According to one embodiment, the first computing device or the second computing device or the third computing device associated with the first user may transmit an identifier display object to another computing device (e.g., a fifth computing device) that is associated with a second user. For example, once the fifth computing device enters a first network comprised in the plurality of networks of the network environment 100, the fifth computing device may be automatically detected within the first network in which case the visual indicator and/or the digital marker object may be generated on, for example, an admin computing device (e.g. fourth computing device). In other embodiments, the transmitted identifier display object may be activated on the fifth computing device following which the visual indicator and/or digital marker object is generated on the admin device. In such cases, temporal data may or may not be generated on one or more of the first computing device, the second computing device, the third computing device, or the fifth computing device based digital configurations associated with a request from at least one of the first computing device, the second computing device, or the third computing device.

It is appreciated that the generation of the visual indicator and/or the digital marker object indicates or represents detection of one or more of the first computing device, the second computing device, the third computing device, or the fifth computing device on or by the fourth computing device or another computing device of the platform system 104.

Adaptively Routing or Rerouting User Requests

In some implementations, the disclosed network technology beneficially enables adaptively routing or rerouting user requests to specific networks within the network environment 100 based on one or more of: user request type; component amount data associated with a parametric data object; and volumetric data associated with a plurality of requests.

For example, once the platform system 104 receives a user request, the analytics system 106 may analyze the user request to determine a request type associated with the user request. The request type for example, may include: data indicating a type of parametric data object being requested; data indicating quantitative or qualitative properties associated with at least one parametric data object; data indicating one or more modifiers associated with at least one parametric data object; temporal data indicating an expected duration associated with completing the user request; data indicating profile information of the user sending the user request via a first computing device; and cumulative frequency data associated with user requests sent from the first computing device or by the first user. In one embodiment the user request type comprises location data including location data of a first network associated with a location of the first computing device (e.g., user device) and from which the user request was sent relative to other networks (e.g., a second network, a third network, etc.) of the network environment 100 of FIGS. 1A and 1B such that the other networks are configured to fulfil or respond to user requests. Based on the request type, the analytics system may automatically reroute the user request to a network within one or more networks of the network environment that can complete or otherwise fill or respond to queries comprised in the user request. In one embodiment, the user request may be filled by an identified network comprised in the network environment 100 based on availability of one or more components and/or one or more parametric data objects associated with said identified network.

Furthermore, the analytics system 106 may link the user request to a specific network within the network environment 100 based on user defined inputs or proximity data establishing a distance between the first network from which the user sent the request and one or more networks of the network environment 100 which can fulfil the user request. As done above, the proximity data may be analyzed to determine which identified network within the network environment 100 has the necessary components and/or parametric data objects to respond or otherwise fill the user request. If the user-defined network cannot respond or fill the user request, the proximity data is leveraged by the analytics systems to determine which identified network comprised in the network environment 100 is proximal relative to the user's network so that said identified network can fill or respond to the user request.

Leveraging Profile Data, Temporal Data, and/or User Request Data

According to one embodiment, the disclosed solution enables combining one or more of user profile data, temporal data, and/or user request data to customize and/or format multi-dimensional visualizations associated with parametric lists and/or parametric data objects. For example, an application associated with the network environment 100 may be loaded on a user device such that prior to loading the application, the analytics system 106 analyzes: the profile data (e.g., user profile data or device profile data); and/or temporal data associated with one or more networks within the network environment 100 that can respond and/or fill user requests; and/or current or prior user request data associated with the user profile data and/or device profile data associated with a user submitting the request. Upon conducting the analysis, the analytics system may initiate generation and/or display and/or customizing and/or formatting a multi-dimensional visualization associated with at least one parametric list or at least one parametric data object.

Combining User Request Data With Third-Party System Data

In some embodiments, the network environment 100 can combine user request data with third-party system data to respond to user requests within the network environment 100. For example, the user request may originate via, for example, the user access system 102*a* or via, for example, an application associated with at least one third-party system 120*a* . . . 120*n*. In any case regardless of whether the user request originated from the user access system 102*a* or one of the third-party system 120*a* . . . 120*n*, the user request may leverage a service (e.g., a computing service) of a third-party system 120*a* . . . 120*n* such that the service facilitates execution and/or completing the user request. In some embodiments, the analytics system evaluates third-party system data to extract user requests and respond to same using one or more of: a third-party system 120*a* . . . 120*n*; a first user computing device; or a combination of the third-party system 120*a* . . . 120*n* and the first user computing device; or a combination of the third-party system and a second user computing device; or a combination of the third-party system, the first user device, and the second user device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the disclosed subject-matter and its practical applications, to thereby enable others skilled in the art to use the technology disclosed and various embodiments with various modifications as are suited to the particular use contemplated. It is appreciated that the term optimize/optimal and its variants (e.g., efficient or optimally) may simply indicate improving, rather than the ultimate form of 'perfection' or the like.

Furthermore, the functions or operations described above can be implemented in digital electronic circuitry, in computer software, firmware or hardware. In particular, the disclosed techniques can be implemented using one or more computer program products. The computer program products, in some embodiments, comprises non-transitory computer-readable media comprising code configured to execute the disclosed approach. Programmable processors and computers can be included in or packaged as mobile devices according to some embodiments. The processes and logic flows can be performed by one or more programmable processors and by one or more programmable logic circuitry. General and special purpose computing devices and storage devices can be interconnected through communication networks.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

What is claimed is:

1. A method for adapting parametric data objects and modifying parametric lists in a network, the method comprising:

receiving, using one or more computing device processors, a first user request associated with a first user using a first computing device;

receiving, using the one or more computing device processors, a second user request associated with a second user using a second computing device;

executing, using an authentication security system, a first security operation associated with a network, wherein the first security operation comprises determining whether the first user using the first computing device is allowed to access the network;

executing, using the authentication security system, a second security operation associated with the network, wherein the second security operation comprises determining whether the second user using the second computing device is allowed to access the network;

determining, using an application programming interface (API) authorizer, whether the first user request associated with the first user using the first computing device originates from a first approved application;

determining, using the API authorizer, whether the second user request associated with the second user using the second computing device originates from the first approved application or a second approved application;

in response to the API authorizer determining the first user request originates from the first approved application, directing, an API entry point, to activate a first API for responding to the first user request;

in response to the API authorizer determining the second user request originates from the first approved application or the second approved application, directing, the API entry point to activate the first API or a second API for responding to the second user request;

coordinating or distributing, using a network load balancer, execution of the first user request and execution of the second user request by an analytics system associated with the network;

resolving, using the analytics system associated with the network and based on the first API, the first user request to determine one or more first parametric lists or first parametric data objects associated with a first location relative to the first user using the first computing device, wherein the first parametric data objects comprise at least one of first nutrition-related data, first equipment-related data, first food-related data, first restaurant-related data, or first computing service-related data;

resolving, using the analytics system associated with the network and based on the first API or the second API, the second user request to determine one or more second parametric lists or second parametric data objects associated with a second location relative to the second user using the second computing device, wherein the second parametric data objects comprise at least one of second nutrition-related data, second equipment-related data, second food-related data, second restaurant-related data, or second computing service-related data;

adapting, using the analytics system associated with the network and based on first data comprised in the first user request, the first parametric data objects to generate an adapted first set of parametric data objects for the first location, thereby linking the adapted first set of parametric data objects to location data associated with the first location to modify a first parametric list such that a modified first parametric list comprises the adapted first set of parametric data objects;

adapting, using the analytics system associated with the network and based on second data comprised in the second user request, the second parametric data objects to generate an adapted second set of parametric data objects for the second location, thereby linking the adapted second set of parametric data objects to location data associated with the second location to modify a second parametric list such that a modified second parametric list comprises the adapted second set of parametric data objects;

initiate formatting, using the first API, first content data comprising the modified first parametric list for display on a first graphical interface to the first user using the first computing device or a third user using a third computing device associated with the first location; and initiate formatting, using the second API or the first API, second content data comprising the modified second parametric list for display on a second graphical interface to the second user using the second computing device or a fourth user using a fourth computing device associated with the second location.

2. The method of claim 1, wherein a traffic security system interacts with a network interface for enabling the first user using the first computing device associated with the first user request received from the first computing device to connect to the network.

3. The method of claim 1, wherein the first parametric list comprises one or more of:
component combination data associated with the one or more first parametric lists or first parametric data objects; and
parametric data object combination data associated with the one or more first parametric lists or first parametric data objects.

4. The method of claim 3, wherein:
the component combination data comprises a combination of one or more components associated with the first parametric data objects; and
the parametric data object combination comprises a combination of one or more parametric data objects including the first parametric data objects.

5. The method of claim 1, further comprising providing access, using a security repository system and using the API entry point, to the analytics system.

6. The method of claim 1, wherein in response to the first user using the first computing device interacting with the first content data or the second user using the second computing device interacting with the second content data, updating a third parametric list associated with a third location or a fourth location to generate a modified third parametric list.

7. The method of claim 6, further comprising providing, on a graphical display device, the modified third parametric list to one or more of:
the first user using the first computing device;
the second user using the second computing device;
the third user using the third computing device associated with the third location; or
the fourth user using the fourth computing device associated with the fourth location.

8. The method of claim 6, wherein the modified third parametric list is generated based on arriving at or exceeding a component threshold data value associated with at least one of the first location, the second location, the third location, or the fourth location.

9. The method of claim 1, wherein the first user using the first computing device comprises an administrative or non-administrative user.

10. The method of claim 1, further comprising enabling the first user using the first computing device, or the third user using the third computing device, selective access to the modified first parametric list for the first location.

11. The method of claim 1, further comprising dynamically generating the modified first parametric list by adjusting the adapted first set of parametric data objects or third parametric data objects associated with the first location based on availability data variably indicating data changes to component information associated with the first location.

12. The method of claim 1, further comprising determining that the first location is associated with the first user using the first computing device and determining that the second location is associated with the second user using the second computing device.

13. The method of claim 1, wherein the first user request is received from a mobile or non-mobile computing device.

14. The method of claim 1, wherein the analytics system comprises one or more dynamic container services.

15. The method of claim 1, further comprising providing a message broker system for coordinating progression of the first user request or the second user request.

16. The method of claim 1, further comprising providing a structured database system to enable determining that a computing operation being executed in the network is within an operational threshold or limit.

17. The method of claim 1, wherein:
 in response to the first user using the first computing device interacting with the first content data, updating the modified first parametric list for the first location; and
 in response to the second user using the second computing device interacting with the second content data, updating the modified second parametric list for the second location.

18. The method of claim 1, further comprising providing a messaging system for facilitating electronic communication among one or more systems or devices connected to the network.

19. An apparatus for adapting parametric data objects and modifying parametric lists in a network, the apparatus comprising a physical memory storing instructions; and one or more computing device processors configured to execute the instructions, wherein the instructions are for:
 receiving a first user request associated with a first user using a first computing device;
 receiving a second user request associated with a second user using a second computing device;
 executing, using a traffic security system, a first security operation associated with a network, wherein the first security operation comprises determining whether the first user using the first computing device is allowed to access the network;
 executing, using the traffic security system, a second security operation associated with the network, wherein the second security operation comprises determining whether the second user using the second computing device is allowed to access the network;
 determining, using an API authorizer, whether the first user request associated with the first user using the first computing device originates from a first approved application;
 determining, using the API authorizer, whether the second user request associated with the second user using the second computing device originates from the first approved application or a second approved application;
 in response to the API authorizer determining the first user request originates from the first approved application, directing, an API entry point, to activate a first API for responding to the first user request;
 in response to the API authorizer determining the second user request originates from the first approved application or the second approved application, directing, the API entry point to activate the first API or a second API for responding to the second user request;
 coordinating or distributing, using a network load balancer, execution of the first user request and execution of the second user request by an analytics system associated with the network;
 resolving, using the analytics system associated with the network and based on the first API, the first user request to determine one or more first parametric lists or first parametric data objects associated with a first location relative to the first user using the first computing device, wherein the first parametric data objects comprise at least one of first nutrition-related data, first equipment-related data, first food-related data, first restaurant-related data, or first computing service-related data;
 resolving, using the analytics system associated with the network and based on the first API or the second API, the second user request to determine one or more second parametric lists or second parametric data objects associated with a second location relative to the second user using the second computing device, wherein the second parametric data objects comprise at least one of second nutrition-related data, second equipment-related data, second food-related data, second restaurant-related data, or second computing service-related data;
 adapting, using the analytics system associated with the network and based on first data comprised in the first user request, the first parametric data objects to generate an adapted first set of parametric data objects for the first location, thereby linking the adapted first set of parametric data objects to location data associated with the first location to modify a first parametric list such that a modified first parametric list comprises the adapted first set of parametric data objects;
 adapting, using the analytics system associated with the network and based on second data comprised in the second user request, the second parametric data objects to generate an adapted second set of parametric data objects for the second location, thereby linking the adapted second set of parametric data objects to location data associated with the second location to modify a second parametric list such that a modified second parametric list comprises the adapted second set of parametric data objects;
 initiate formatting, using the first API, first content data comprising the modified first parametric list for display on a first graphical interface to the first user using the first computing device or a third user using a third computing device associated with the first location; and
 initiate formatting, using the second API or the first API, second content data comprising the modified second parametric list for display on a second graphical interface to the second user using the second computing device or a fourth user using a fourth computing device associated with the second location.

20. A non-transitory computer-readable medium for adapting parametric data objects and modifying parametric lists in a network, the non-transitory computer-readable medium comprising code configured for:
 receiving a first user request associated with a first user using a first computing device;
 receiving a second user request associated with a second user using a second computing device;
 executing, using a traffic security system, a first security operation associated with a network, wherein the first security operation comprises determining whether the first user using the first computing device is allowed to access the network;

executing, using the traffic security system, a second security operation associated with the network, wherein the second security operation comprises determining whether the second user using the second computing device is allowed to access the network;

determining, using an API authorizer, whether the first user request associated with the first user using the first computing device originates from a first approved application;

determining, using the API authorizer, whether the second user request associated with the second user using the second computing device originates from the first approved application or a second approved application;

in response to the API authorizer determining the first user request originates from the first approved application, directing, an API entry point, to activate a first API for responding to the first user request;

in response to the API authorizer determining the second user request originates from the first approved application or the second approved application, directing, the API entry point to activate the first API or a second API for responding to the second user request;

coordinating or distributing, using a network load balancer, execution of the first user request and execution of the second user request by an analytics system associated with the network;

resolving, using the analytics system associated with the network and based on the first API, the first user request to determine one or more first parametric lists or first parametric data objects associated with a first location relative to the first user using the first computing device, wherein the first parametric data objects comprise at least one of first nutrition-related data, first equipment-related data, first food-related data, first restaurant-related data, or first computing service-related data;

resolving, using the analytics system associated with the network and based on the first API or the second API, the second user request to determine one or more second parametric lists or second parametric data objects associated with a second location relative to the second user using the second computing device, wherein the second parametric data objects comprise at least one of second nutrition-related data, second equipment-related data, second food-related data, second restaurant-related data, or second computing service-related data;

adapting, using the analytics system associated with the network and based on first data comprised in the first user request, the first parametric data objects to generate an adapted first set of parametric data objects for the first location, thereby linking the adapted first set of parametric data objects to location data associated with the first location to modify a first parametric list such that a modified first parametric list comprises the adapted first set of parametric data objects;

adapting, using the analytics system associated with the network and based on second data comprised in the second user request, the second parametric data objects to generate an adapted second set of parametric data objects for the second location, thereby linking the adapted second set of parametric data objects to location data associated with the second location to modify a second parametric list such that a modified second parametric list comprises the adapted second set of parametric data objects;

initiate formatting, using the first API, first content data comprising the modified first parametric list for display on a first graphical interface to the first user using the first computing device or a third user using a third computing device associated with the first location; and initiate formatting, using the second API or the first API, second content data comprising the modified second parametric list for display on a second graphical interface to the second user using the second computing device or a fourth user using a fourth computing device associated with the second location.

* * * * *